(12) United States Patent
Li et al.

(10) Patent No.: US 11,714,763 B2
(45) Date of Patent: Aug. 1, 2023

(54) CONFIGURATION INTERFACE TO OFFLOAD CAPABILITIES TO A NETWORK INTERFACE

(71) Applicant: Intel Corporation, Santa Clara, CA (US)

(72) Inventors: Yadong Li, Portland, OR (US); Jose Niell, Franklin, MA (US); Kiel Boyle, Vancouver (CA)

(73) Assignee: Intel Corporation, Santa Clara, CA (US)

( * ) Notice: Subject to any disclaimer, the term of this patent is extended or adjusted under 35 U.S.C. 154(b) by 167 days.

(21) Appl. No.: 17/030,921

(22) Filed: Sep. 24, 2020

(65) Prior Publication Data

US 2021/0019270 A1 Jan. 21, 2021

Related U.S. Application Data

(60) Provisional application No. 62/916,136, filed on Oct. 16, 2019.

(51) Int. Cl.
| | |
|---|---|
| *G06F 13/16* | (2006.01) |
| *G06F 9/50* | (2006.01) |
| *G06F 13/42* | (2006.01) |
| *G06Q 10/0631* | (2023.01) |

(52) U.S. Cl.
CPC ........ *G06F 13/1668* (2013.01); *G06F 9/5083* (2013.01); *G06F 13/4204* (2013.01); *G06F 13/4282* (2013.01); *G06F 2213/0026* (2013.01); *G06F 2213/0036* (2013.01); *G06Q 10/0631* (2013.01)

(58) Field of Classification Search
CPC .......... G06F 21/57; G06F 9/455; H04L 29/06
See application file for complete search history.

(56) References Cited

U.S. PATENT DOCUMENTS

| | | | |
|---|---|---|---|
| 11,366,700 B1* | 6/2022 | Goren | G06F 9/505 |
| 11,442,765 B1* | 9/2022 | Zhang | G06F 11/3495 |
| 2019/0042292 A1* | 2/2019 | Palermo | G06F 9/3877 |
| 2019/0273700 A1* | 9/2019 | Itkin | G06F 9/4416 |
| 2019/0303046 A1* | 10/2019 | Yu | G06F 3/0679 |

(Continued)

OTHER PUBLICATIONS

"NVM Express Base Specification", NVM ExpressTM Revision 1.4, Jun. 10, 2019, 403 pages.

(Continued)

*Primary Examiner* — Getente A Yimer
(74) *Attorney, Agent, or Firm* — Compass IP Law PC

(57) ABSTRACT

Examples described herein relate to a network interface controller apparatus, that includes a processor component comprising at least one processor to generate remote memory access communications to access a first group of one or more namespaces; storage interface circuitry to generate remote memory access communications to access a second group of one or more namespaces; and a storage configuration circuitry with a device interface that is accessible through a user space driver, the storage configuration circuitry to set the first and second group of one or more namespaces. In some examples, the device interface is compatible with Peripheral Component Interconnect Express (PCIe) and the storage configuration circuitry is accessible as a physical function (PF) or a virtual function (VF).

23 Claims, 22 Drawing Sheets

(56) References Cited

U.S. PATENT DOCUMENTS

2020/0333964 A1* 10/2020 Wigmore .............. H04L 9/0894
2020/0356672 A1* 11/2020 Paulraj ................. H04L 9/3239

OTHER PUBLICATIONS

"VFIO-over-socket", Jul. 2020, 31 pages.
"What is NVMe and Why is it Important? A Technical Guide", Western Digital, https://blog.westerndigital.com/nvme-important-data-driven-businesses/, Jun. 6, 2020, 4 pages.

* cited by examiner

CONFIGURATION INTERFACE TO OFFLOAD CAPABILITIES TO A NETWORK INTERFACE

RELATED APPLICATION

The present application claims the benefit of priority date of U.S. provisional patent application Ser. No. 62/916,136, filed Oct. 16, 2019, the entire disclosure of which is incorporated herein by reference.

DESCRIPTION

The Non-Volatile Memory Express (NVMe) Specification describes a system for accesses to data storage systems through a Peripheral Component Interconnect Express (PCIe) port. NVMe is described for example, in NVM Express™ Base Specification, Revision 1.3c (2018), as well as predecessors, successors, and proprietary variations thereof, which are incorporated by reference in their entirety. NVMe allows a host device to specify regions of storage as separate namespaces. A namespace can be an addressable domain in a non-volatile memory having a selected number of storage blocks that have been formatted for block access. A namespace can include an addressable portion of a media in a solid state drive (SSD), or a multi-device memory space that spans multiple SSDs or other data storage devices. A namespace ID (NSID) can be a unique identifier for an associated namespace. A host device can access a particular non-volatile memory by specifying an NSID, a controller ID and an associated logical address for the block or blocks (e.g., logical block addresses (LBAs)).

DETAILED DESCRIPTION

Figure 1:
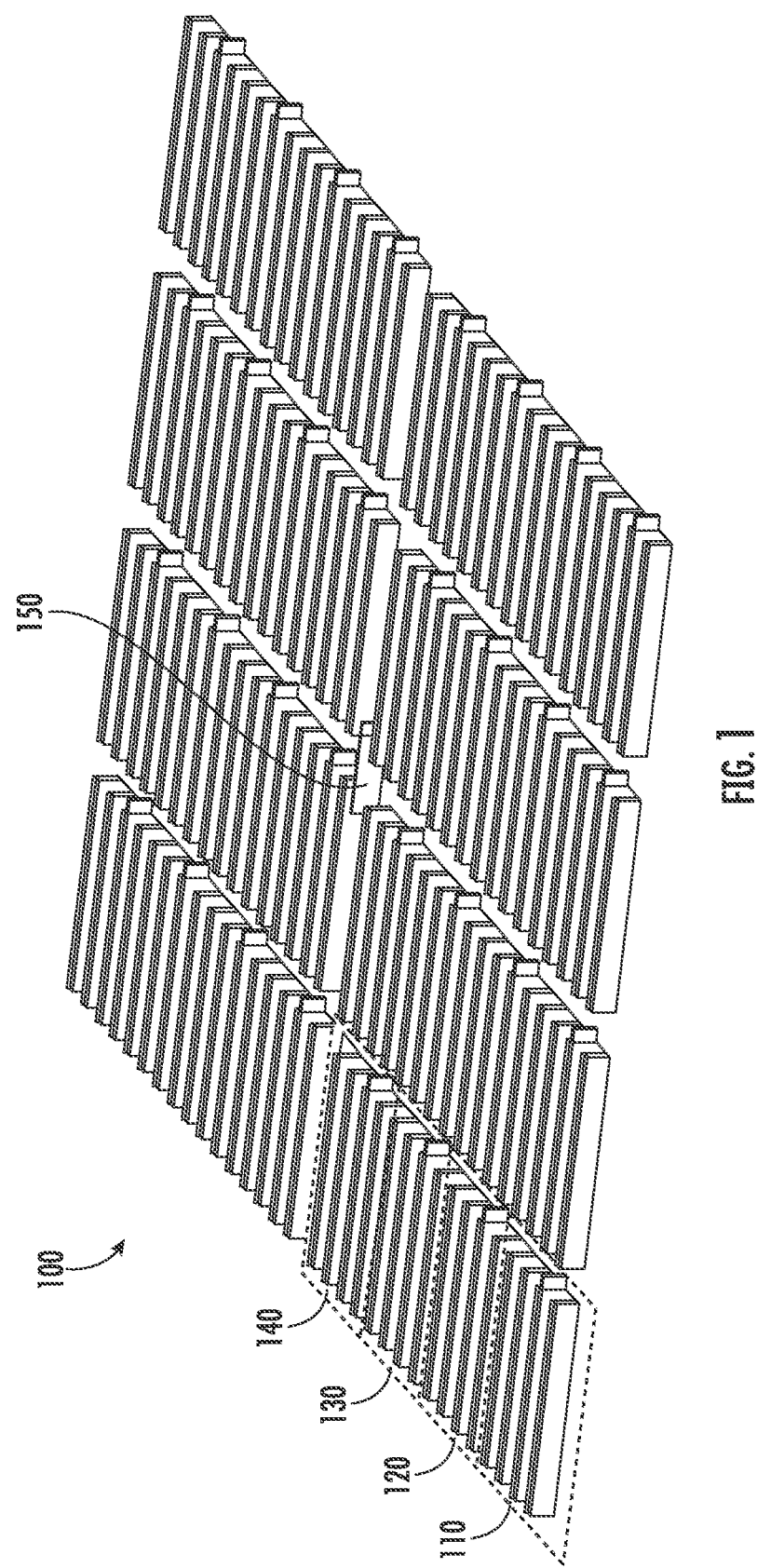
FIG. 1 is a simplified diagram of at least one embodiment of a data center for executing workloads with disaggregated resources.

FIG. 1 depicts a data center in which disaggregated resources may cooperatively execute one or more workloads (e.g., applications on behalf of customers) includes multiple pods 110, 120, 130, 140, a pod being or including one or more rows of racks. Of course, although data center 100 is shown with multiple pods, in some embodiments, the data center 100 may be embodied as a single pod. As described in more detail herein, each rack houses multiple sleds, each of which may be primarily equipped with a particular type of resource (e.g., memory devices, data storage devices, accelerator devices, general purpose processors), e.g., resources that can be logically coupled to form a composed node, which can act as, for example, a server. In the illustrative embodiment, the sleds in each pod 110, 120, 130, 140 are connected to multiple pod switches (e.g., switches that route data communications to and from sleds within the pod). The pod switches, in turn, connect with spine switches 150 that switch communications among pods (e.g., the pods 110, 120, 130, 140) in the data center 100. In some embodiments, the sleds may be connected with a fabric using Intel® Omni-Path technology. In other embodiments, the sleds may be connected with other fabrics, such as InfiniBand or Ethernet. As described in more detail herein, resources within sleds in the data center 100 may be allocated to a group (referred to herein as a "managed node") containing resources from one or more sleds to be collectively utilized in the execution of a workload. The workload can execute as if the resources belonging to the managed node were located on the same sled. The resources in a managed node may belong to sleds belonging to different racks, and even to different pods 110, 120, 130, 140. As such, some resources of a single sled may be allocated to one managed node while other resources of the same sled are allocated to a different managed node (e.g., one processor assigned to one managed node and another processor of the same sled assigned to a different managed node).

A data center comprising disaggregated resources, such as data center 100, can be used in a wide variety of contexts, such as enterprise, government, cloud service provider, and communications service provider (e.g., Telco's), as well in a wide variety of sizes, from cloud service provider mega-data centers that consume over 100,000 sq. ft. to single- or multi-rack installations for use in base stations.

The disaggregation of resources to sleds comprised predominantly of a single type of resource (e.g., compute sleds comprising primarily compute resources, memory sleds containing primarily memory resources), and the selective allocation and deallocation of the disaggregated resources to form a managed node assigned to execute a workload improves the operation and resource usage of the data center 100 relative to typical data centers comprised of hyperconverged servers containing compute, memory, storage and perhaps additional resources in a single chassis. For example, because sleds predominantly contain resources of a particular type, resources of a given type can be upgraded independently of other resources. Additionally, because different resources types (processors, storage, accelerators, etc.) typically have different refresh rates, greater resource utilization and reduced total cost of ownership may be achieved. For example, a data center operator can upgrade the processors throughout their facility by only swapping out the compute sleds. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 2:
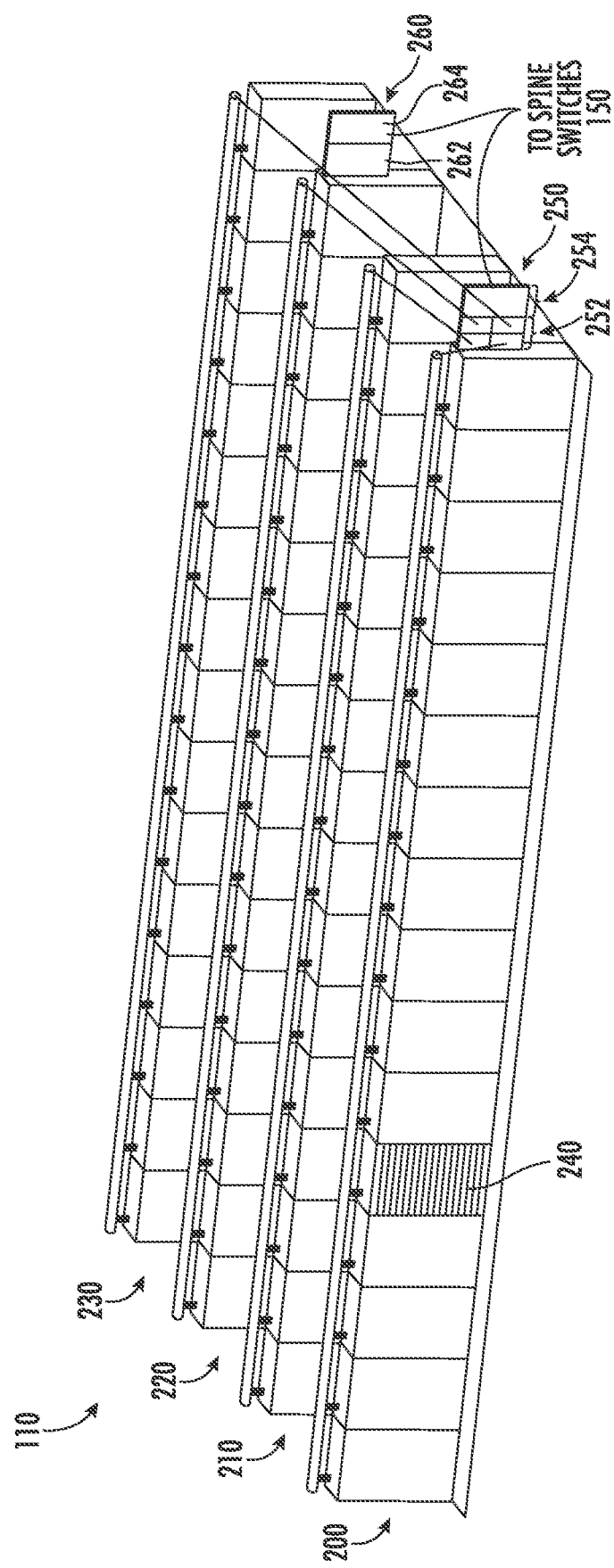
FIG. 2 is a simplified diagram of at least one embodiment of a pod that may be included in a data center.

FIG. 2 depicts a pod. A pod can include a set of rows 200, 210, 220, 230 of racks 240. Each rack 240 may house multiple sleds (e.g., sixteen sleds) and provide power and data connections to the housed sleds, as described in more detail herein. In the illustrative embodiment, the racks in each row 200, 210, 220, 230 are connected to multiple pod switches 250, 260. The pod switch 250 includes a set of ports 252 to which the sleds of the racks of the pod 110 are connected and another set of ports 254 that connect the pod 110 to the spine switches 150 to provide connectivity to other pods in the data center 100. Similarly, the pod switch 260 includes a set of ports 262 to which the sleds of the racks of the pod 110 are connected and a set of ports 264 that connect the pod 110 to the spine switches 150. As such, the use of the pair of switches 250, 260 provides an amount of redundancy to the pod 110. For example, if either of the switches 250, 260 fails, the sleds in the pod 110 may still maintain data communication with the remainder of the data center 100 (e.g., sleds of other pods) through the other switch 250, 260. Furthermore, in the illustrative embodiment, the switches 150, 250, 260 may be embodied as dual-mode optical switches, capable of routing both Ethernet protocol communications carrying Internet Protocol (IP) packets and communications according to a second, high-performance link-layer protocol (e.g., PCI Express) via optical signaling media of an optical fabric.

It should be appreciated that each of the other pods 120, 130, 140 (as well as any additional pods of the data center 100) may be similarly structured as, and have components similar to, the pod 110 shown in and described in regard to FIG. 2 (e.g., each pod may have rows of racks housing multiple sleds as described above). Additionally, while two pod switches 250, 260 are shown, it should be understood that in other embodiments, each pod 110, 120, 130, 140 may be connected to a different number of pod switches, providing even more failover capacity. Of course, in other embodiments, pods may be arranged differently than the rows-of-racks configuration shown in FIGS. 1-2. For example, a pod may be embodied as multiple sets of racks in which each set of racks is arranged radially, e.g., the racks are equidistant from a center switch.

Figure 3:
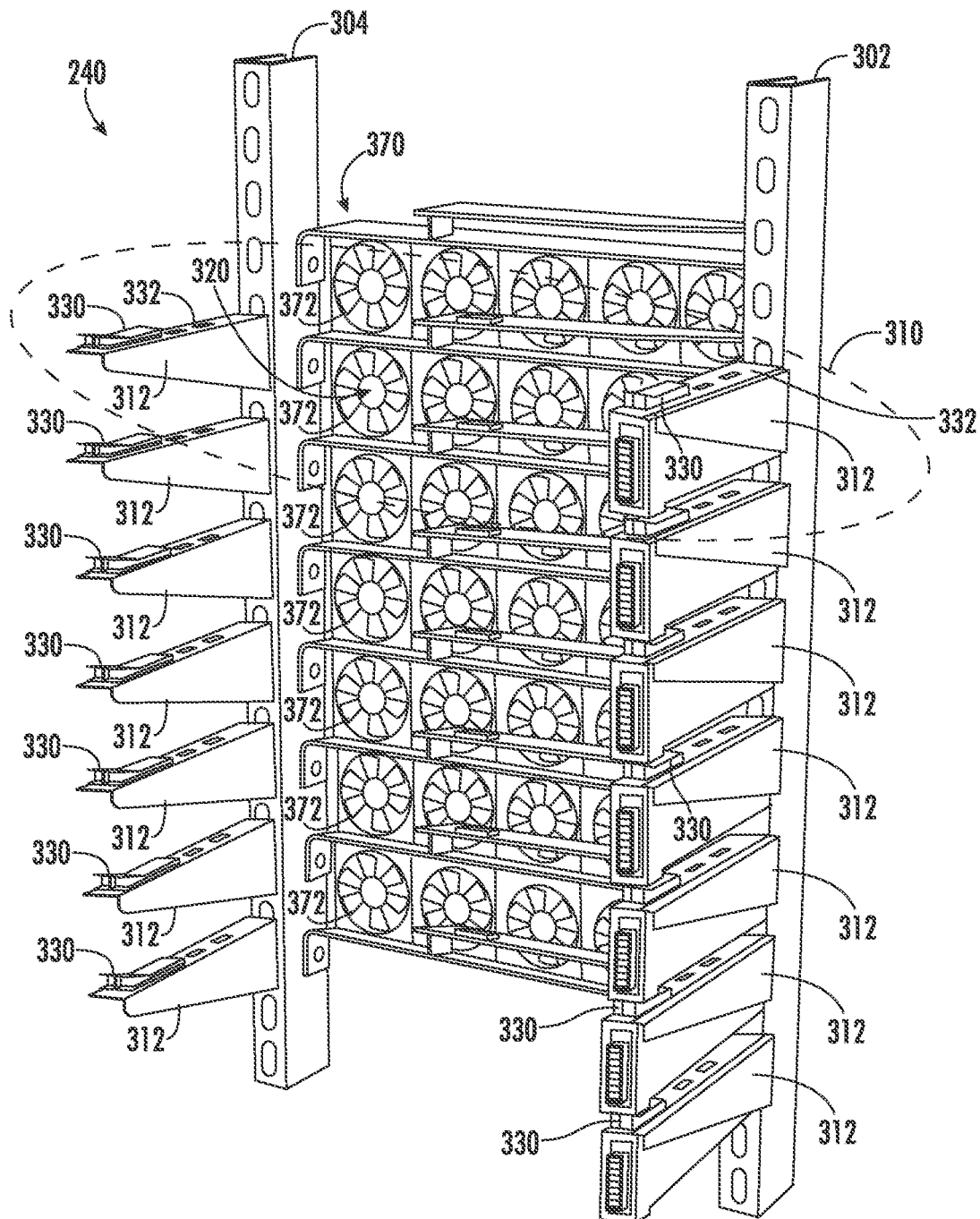
FIG. 3 is a perspective view of at least one embodiment of a rack that may be included in a pod.
Figure 4:
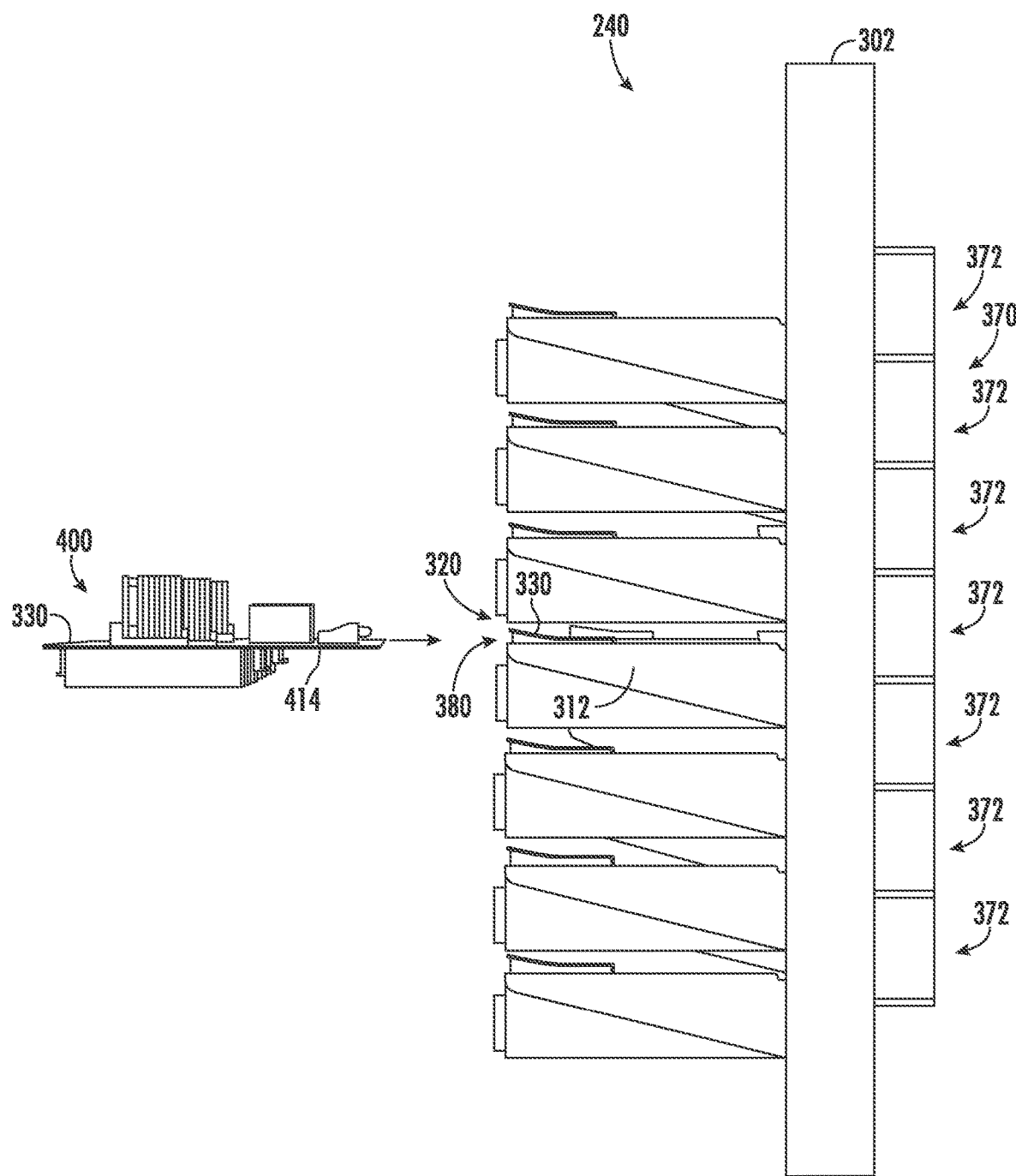
FIG. 4 is a side elevation view of a rack.
Figure 5:
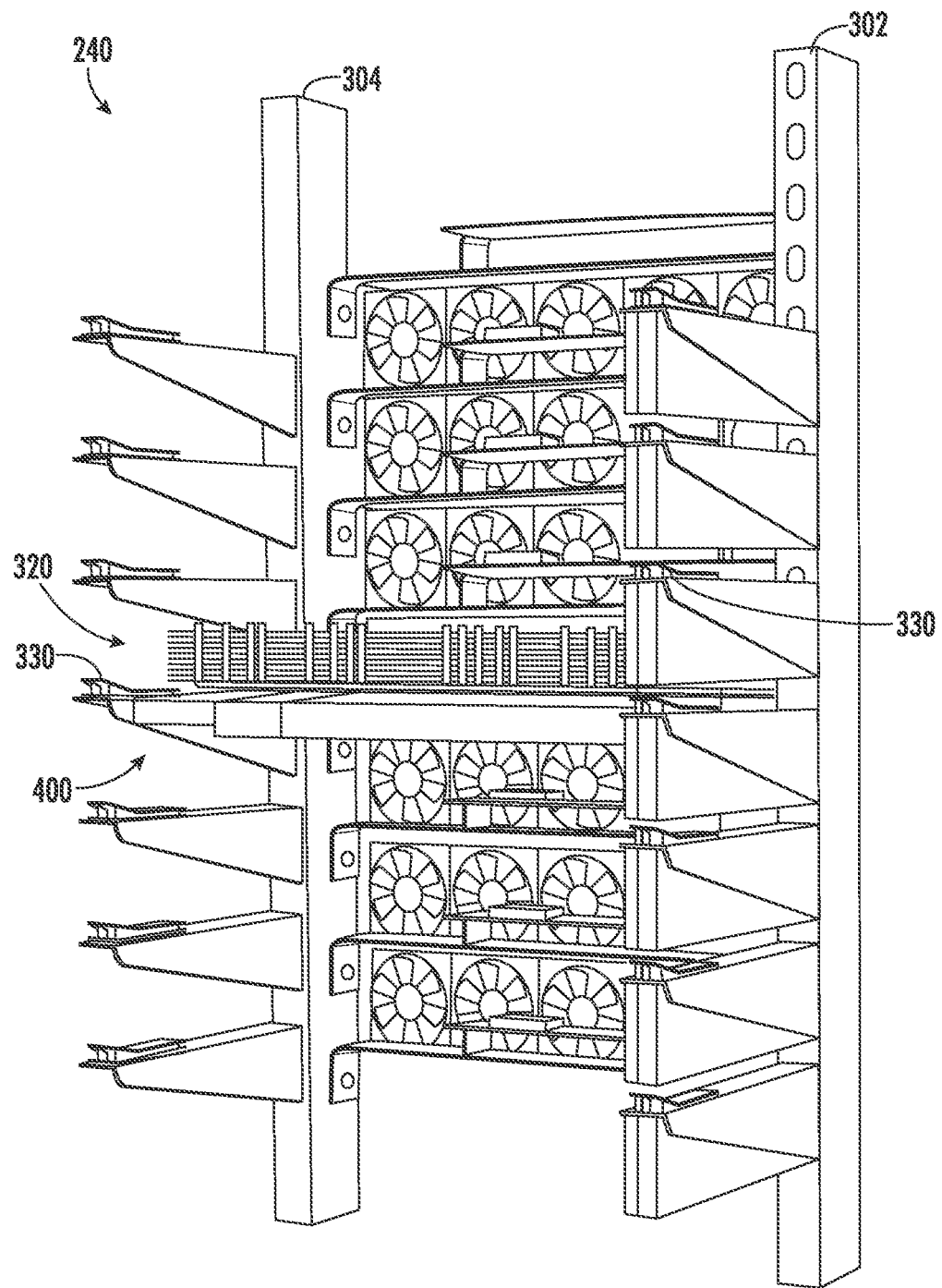
FIG. 5 is a perspective view of a rack having a sled mounted therein.

Referring now to FIGS. 3-5, each illustrative rack 240 of the data center 100 includes two elongated support posts 302, 304, which are arranged vertically. For example, the elongated support posts 302, 304 may extend upwardly from a floor of the data center 100 when deployed. The rack 240 also includes one or more horizontal pairs 310 of elongated support arms 312 (identified in FIG. 3 via a dashed ellipse) configured to support a sled of the data center 100 as discussed below. One elongated support arm 312 of the pair of elongated support arms 312 extends outwardly from the elongated support post 302 and the other elongated support arm 312 extends outwardly from the elongated support post 304.

In the illustrative embodiments, each sled of the data center 100 is embodied as a chassis-less sled. That is, each sled has a chassis-less circuit board substrate on which physical resources (e.g., processors, memory, accelerators, storage, etc.) are mounted as discussed in more detail below. As such, the rack 240 is configured to receive the chassis-less sleds. For example, each pair 310 of elongated support arms 312 defines a sled slot 320 of the rack 240, which is configured to receive a corresponding chassis-less sled. To do so, each illustrative elongated support arm 312 includes a circuit board guide 330 configured to receive the chassis-less circuit board substrate of the sled. Each circuit board guide 330 is secured to, or otherwise mounted to, a top side 332 of the corresponding elongated support arm 312. For example, in the illustrative embodiment, each circuit board guide 330 is mounted at a distal end of the corresponding elongated support arm 312 relative to the corresponding elongated support post 302, 304. For clarity of the Figures, not every circuit board guide 330 may be referenced in each Figure.

Each circuit board guide 330 includes an inner wall that defines a circuit board slot 380 configured to receive the chassis-less circuit board substrate of a sled 400 when the sled 400 is received in the corresponding sled slot 320 of the rack 240. To do so, as shown in FIG. 4, a user (or robot) aligns the chassis-less circuit board substrate of an illustrative chassis-less sled 400 to a sled slot 320. The user, or robot, may then slide the chassis-less circuit board substrate forward into the sled slot 320 such that each side edge 414 of the chassis-less circuit board substrate is received in a corresponding circuit board slot 380 of the circuit board guides 330 of the pair 310 of elongated support arms 312 that define the corresponding sled slot 320 as shown in FIG. 4. By having robotically accessible and robotically manipulatable sleds comprising disaggregated resources, each type of resource can be upgraded independently of each other and at their own optimized refresh rate. Furthermore, the sleds are configured to blindly mate with power and data communication cables in each rack 240, enhancing their ability to be quickly removed, upgraded, reinstalled, and/or replaced. As such, in some embodiments, the data center 100 may operate (e.g., execute workloads, undergo maintenance and/or upgrades, etc.) without human involvement on the data center floor. In other embodiments, a human may facilitate one or more maintenance or upgrade operations in the data center 100.

It should be appreciated that each circuit board guide 330 is dual sided. That is, each circuit board guide 330 includes an inner wall that defines a circuit board slot 380 on each side of the circuit board guide 330. In this way, each circuit board guide 330 can support a chassis-less circuit board substrate on either side. As such, a single additional elongated support post may be added to the rack 240 to turn the rack 240 into a two-rack solution that can hold twice as many sled slots 320 as shown in FIG. 3. The illustrative rack 240 includes seven pairs 310 of elongated support arms 312 that define a corresponding seven sled slots 320, each configured to receive and support a corresponding sled 400 as discussed above. Of course, in other embodiments, the rack 240 may include additional or fewer pairs 310 of elongated support arms 312 (e.g., additional or fewer sled slots 320). It should be appreciated that because the sled 400 is chassis-less, the sled 400 may have an overall height that is different than typical servers. As such, in some embodiments, the height of each sled slot 320 may be shorter than the height of a typical server (e.g., shorter than a single rank unit, "1 U"). That is, the vertical distance between each pair 310 of elongated support arms 312 may be less than a standard rack unit "1 U." Additionally, due to the relative decrease in height of the sled slots 320, the overall height of the rack 240 in some embodiments may be shorter than the height of traditional rack enclosures. For example, in some embodiments, each of the elongated support posts 302, 304 may have a length of six feet or less. Again, in other embodiments, the rack 240 may have different dimensions. For example, in some embodiments, the vertical distance between each pair 310 of elongated support arms 312 may be greater than a standard rack until "1 U". In such embodiments, the increased vertical distance between the sleds allows for larger heat sinks to be attached to the physical resources and for larger fans to be used (e.g., in the fan array 370 described below) for cooling each sled, which in turn can allow the physical resources to operate at increased power levels. Further, it should be appreciated that the rack 240 does not include any walls, enclosures, or the like. Rather, the rack 240 is an enclosure-less rack that is opened to the local environment. Of course, in some cases, an end plate may be attached to one of the elongated support posts 302, 304 in those situations in which the rack 240 forms an end-of-row rack in the data center 100.

In some embodiments, various interconnects may be routed upwardly or downwardly through the elongated support posts 302, 304. To facilitate such routing, each elongated support post 302, 304 includes an inner wall that defines an inner chamber in which interconnects may be located. The interconnects routed through the elongated support posts 302, 304 may be embodied as any type of interconnects including, but not limited to, data or communication interconnects to provide communication connections to each sled slot 320, power interconnects to provide power to each sled slot 320, and/or other types of interconnects.

The rack 240, in the illustrative embodiment, includes a support platform on which a corresponding optical data connector (not shown) is mounted. Each optical data connector is associated with a corresponding sled slot 320 and is configured to mate with an optical data connector of a corresponding sled 400 when the sled 400 is received in the corresponding sled slot 320. In some embodiments, optical connections between components (e.g., sleds, racks, and switches) in the data center 100 are made with a blind mate optical connection. For example, a door on each cable may prevent dust from contaminating the fiber inside the cable. In the process of connecting to a blind mate optical connector mechanism, the door is pushed open when the end of the cable approaches or enters the connector mechanism. Subsequently, the optical fiber inside the cable may enter a gel within the connector mechanism and the optical fiber of one cable comes into contact with the optical fiber of another cable within the gel inside the connector mechanism.

The illustrative rack 240 also includes a fan array 370 coupled to the cross-support arms of the rack 240. The fan array 370 includes one or more rows of cooling fans 372, which are aligned in a horizontal line between the elongated support posts 302, 304. In the illustrative embodiment, the fan array 370 includes a row of cooling fans 372 for each sled slot 320 of the rack 240. As discussed above, each sled 400 does not include any on-board cooling system in the illustrative embodiment and, as such, the fan array 370 provides cooling for each sled 400 received in the rack 240. Each rack 240, in the illustrative embodiment, also includes a power supply associated with each sled slot 320. Each power supply is secured to one of the elongated support arms 312 of the pair 310 of elongated support arms 312 that define the corresponding sled slot 320. For example, the rack 240 may include a power supply coupled or secured to each elongated support arm 312 extending from the elongated support post 302. Each power supply includes a power connector configured to mate with a power connector of the sled 400 when the sled 400 is received in the corresponding sled slot 320. In the illustrative embodiment, the sled 400 does not include any on-board power supply and, as such, the power supplies provided in the rack 240 supply power to corresponding sleds 400 when mounted to the rack 240. Each power supply is configured to satisfy the power requirements for its associated sled, which can vary from sled to sled. Additionally, the power supplies provided in the rack 240 can operate independent of each other. That is, within a single rack, a first power supply providing power to a compute sled can provide power levels that are different than power levels supplied by a second power supply providing power to an accelerator sled. The power supplies may be controllable at the sled level or rack level, and may be controlled locally by components on the associated sled or remotely, such as by another sled or an orchestrator.

Figure 6:
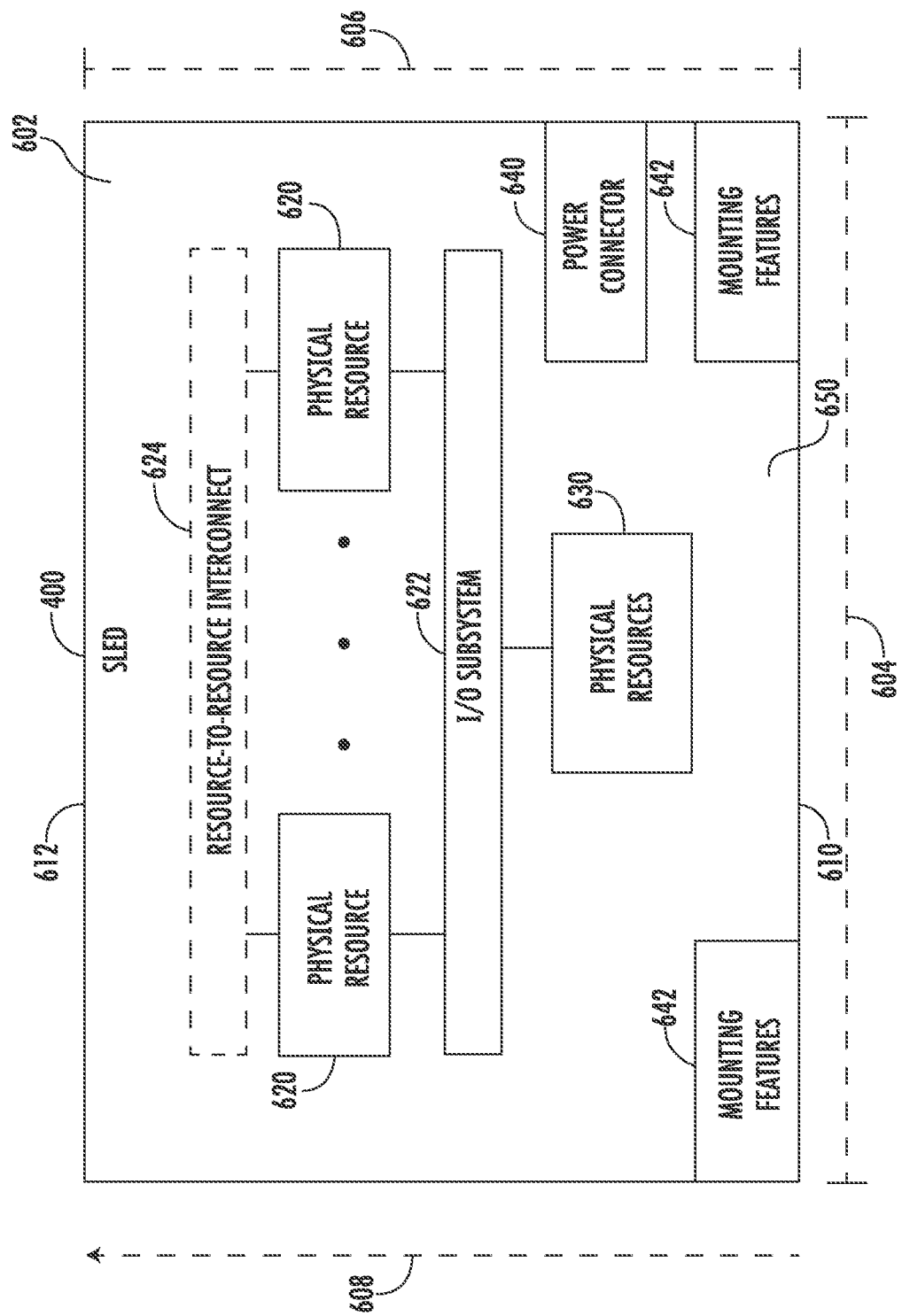
FIG. 6 is a simplified block diagram of at least one embodiment of a top side of a sled.

Referring now to FIG. 6, the sled 400, in the illustrative embodiment, is configured to be mounted in a corresponding rack 240 of the data center 100 as discussed above. In some embodiments, each sled 400 may be optimized or otherwise configured for performing particular tasks, such as compute tasks, acceleration tasks, data storage tasks, etc. For example, the sled 400 may be embodied as a compute sled 800 as discussed below in regard to FIGS. 8-9, an accelerator sled 1000 as discussed below in regard to FIGS. 10-11, a storage sled 1200 as discussed below in regard to FIGS. 12-13, or as a sled optimized or otherwise configured to perform other specialized tasks, such as a memory sled 1400, discussed below in regard to FIG. 14.

As discussed above, the illustrative sled 400 includes a chassis-less circuit board substrate 602, which supports various physical resources (e.g., electrical components) mounted thereon. It should be appreciated that the circuit board substrate 602 is "chassis-less" in that the sled 400 does not include a housing or enclosure. Rather, the chassis-less circuit board substrate 602 is open to the local environment. The chassis-less circuit board substrate 602 may be formed from any material capable of supporting the various electrical components mounted thereon. For example, in an illustrative embodiment, the chassis-less circuit board substrate 602 is formed from an FR-4 glass-reinforced epoxy laminate material. Of course, other materials may be used to form the chassis-less circuit board substrate 602 in other embodiments.

As discussed in more detail below, the chassis-less circuit board substrate 602 includes multiple features that improve the thermal cooling characteristics of the various electrical components mounted on the chassis-less circuit board substrate 602. As discussed, the chassis-less circuit board substrate 602 does not include a housing or enclosure, which may improve the airflow over the electrical components of the sled 400 by reducing those structures that may inhibit air flow. For example, because the chassis-less circuit board substrate 602 is not positioned in an individual housing or enclosure, there is no vertically-arranged backplane (e.g., a backplate of the chassis) attached to the chassis-less circuit board substrate 602, which could inhibit air flow across the electrical components. Additionally, the chassis-less circuit board substrate 602 has a geometric shape configured to reduce the length of the airflow path across the electrical components mounted to the chassis-less circuit board substrate 602. For example, the illustrative chassis-less circuit board substrate 602 has a width 604 that is greater than a depth 606 of the chassis-less circuit board substrate 602. In one particular embodiment, for example, the chassis-less circuit board substrate 602 has a width of about 21 inches and a depth of about 9 inches, compared to a typical server that has a width of about 17 inches and a depth of about 39 inches. As such, an airflow path 608 that extends from a front edge 610 of the chassis-less circuit board substrate 602 toward a rear edge 612 has a shorter distance relative to typical servers, which may improve the thermal cooling characteristics of the sled 400. Furthermore, although not illustrated in FIG. 6, the various physical resources mounted to the chassis-less circuit board substrate 602 are mounted in corresponding locations such that no two substantively heat-producing electrical components shadow each other as discussed in more detail below. That is, no two electrical components, which produce appreciable heat during operation (e.g., greater than a nominal heat sufficient enough to adversely impact the cooling of another electrical component), are mounted to the chassis-less circuit board substrate 602 linearly in-line with each other along the direction of the airflow path 608 (e.g., along a direction extending from the front edge 610 toward the rear edge 612 of the chassis-less circuit board substrate 602).

As discussed above, the illustrative sled 400 includes one or more physical resources 620 mounted to a top side 650 of the chassis-less circuit board substrate 602. Although two physical resources 620 are shown in FIG. 6, it should be appreciated that the sled 400 may include one, two, or more physical resources 620 in other embodiments. The physical resources 620 may be embodied as any type of processor, controller, or other compute circuit capable of performing various tasks such as compute functions and/or controlling the functions of the sled 400 depending on, for example, the type or intended functionality of the sled 400. For example, as discussed in more detail below, the physical resources 620 may be embodied as high-performance processors in embodiments in which the sled 400 is embodied as a compute sled, as accelerator co-processors or circuits in embodiments in which the sled 400 is embodied as an accelerator sled, storage controllers in embodiments in which the sled 400 is embodied as a storage sled, or a set of memory devices in embodiments in which the sled 400 is embodied as a memory sled.

The sled 400 also includes one or more additional physical resources 630 mounted to the top side 650 of the chassis-less circuit board substrate 602. In the illustrative embodiment, the additional physical resources include a network interface controller (NIC) as discussed in more detail below. Of course, depending on the type and functionality of the sled 400, the physical resources 630 may include additional or other electrical components, circuits, and/or devices in other embodiments.

The physical resources 620 are communicatively coupled to the physical resources 630 via an input/output (I/O) subsystem 622. The I/O subsystem 622 may be embodied as circuitry and/or components to facilitate input/output operations with the physical resources 620, the physical resources 630, and/or other components of the sled 400. For example, the I/O subsystem 622 may be embodied as, or otherwise include, memory controller hubs, input/output control hubs, integrated sensor hubs, firmware devices, communication links (e.g., point-to-point links, bus links, wires, cables, waveguides, light guides, printed circuit board traces, etc.), and/or other components and subsystems to facilitate the input/output operations. In the illustrative embodiment, the I/O subsystem 622 is embodied as, or otherwise includes, a double data rate 4 (DDR4) data bus or a DDR5 data bus.

In some embodiments, the sled 400 may also include a resource-to-resource interconnect 624. The resource-to-resource interconnect 624 may be embodied as any type of communication interconnect capable of facilitating resource-to-resource communications. In the illustrative embodiment, the resource-to-resource interconnect 624 is embodied as a high-speed point-to-point interconnect (e.g., faster than the I/O subsystem 622). For example, the resource-to-resource interconnect 624 may be embodied as a QuickPath Interconnect (QPI), an UltraPath Interconnect (UPI), PCI express (PCIe), or other high-speed point-to-point interconnect dedicated to resource-to-resource communications.

The sled 400 also includes a power connector 640 configured to mate with a corresponding power connector of the rack 240 when the sled 400 is mounted in the corresponding rack 240. The sled 400 receives power from a power supply of the rack 240 via the power connector 640 to supply power to the various electrical components of the sled 400. That is, the sled 400 does not include any local power supply (e.g., an on-board power supply) to provide power to the electrical components of the sled 400. The exclusion of a local or on-board power supply facilitates the reduction in the overall footprint of the chassis-less circuit board substrate 602, which may increase the thermal cooling characteristics of the various electrical components mounted on the chassis-less circuit board substrate 602 as discussed above. In some embodiments, voltage regulators are placed on a bottom side 750 (see FIG. 7) of the chassis-less circuit board substrate 602 directly opposite of the processors 820 (see FIG. 8), and power is routed from the voltage regulators to the processors 820 by vias extending through the circuit board substrate 602. Such a configuration provides an increased thermal budget, additional current and/or voltage, and better voltage control relative to typical printed circuit boards in which processor power is delivered from a voltage regulator, in part, by printed circuit traces.

In some embodiments, the sled 400 may also include mounting features 642 configured to mate with a mounting arm, or other structure, of a robot to facilitate the placement of the sled 600 in a rack 240 by the robot. The mounting features 642 may be embodied as any type of physical structures that allow the robot to grasp the sled 400 without damaging the chassis-less circuit board substrate 602 or the electrical components mounted thereto. For example, in some embodiments, the mounting features 642 may be embodied as non-conductive pads attached to the chassis-less circuit board substrate 602. In other embodiments, the mounting features may be embodied as brackets, braces, or other similar structures attached to the chassis-less circuit board substrate 602. The particular number, shape, size, and/or make-up of the mounting feature 642 may depend on the design of the robot configured to manage the sled 400.

Figure 7:
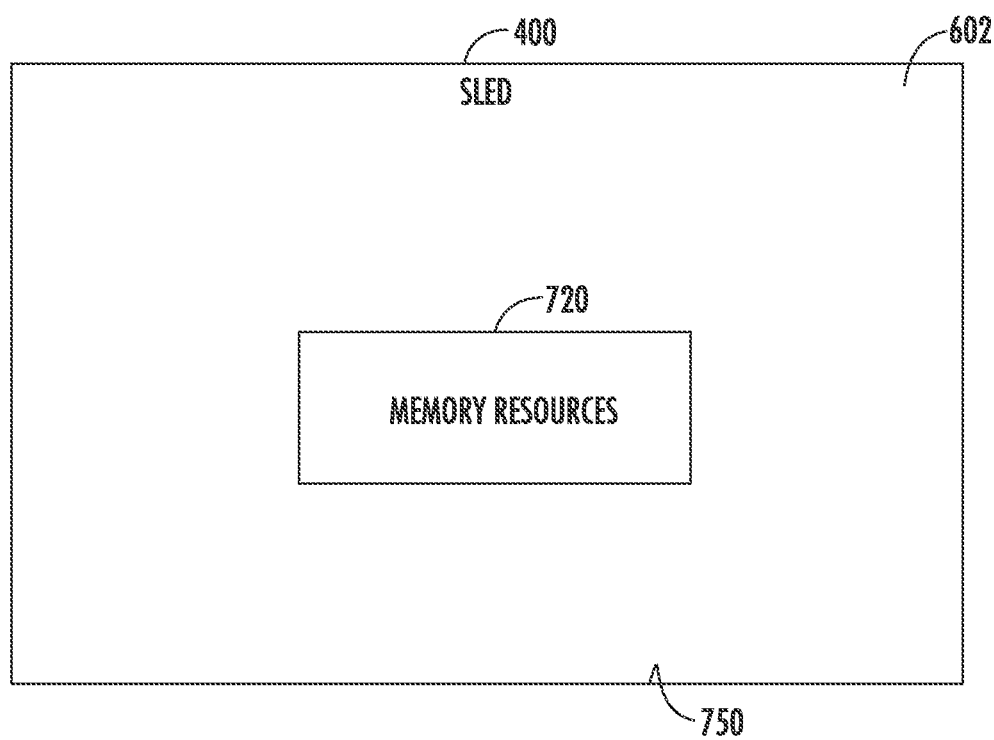
FIG. 7 is a simplified block diagram of at least one embodiment of a bottom side of a sled.

Referring now to FIG. 7, in addition to the physical resources 630 mounted on the top side 650 of the chassis-less circuit board substrate 602, the sled 400 also includes one or more memory devices 720 mounted to a bottom side 750 of the chassis-less circuit board substrate 602. That is, the chassis-less circuit board substrate 602 is embodied as a double-sided circuit board. The physical resources 620 are communicatively coupled to the memory devices 720 via the I/O subsystem 622. For example, the physical resources 620 and the memory devices 720 may be communicatively coupled by one or more vias extending through the chassis-less circuit board substrate 602. Each physical resource 620 may be communicatively coupled to a different set of one or more memory devices 720 in some embodiments. Alternatively, in other embodiments, each physical resource 620 may be communicatively coupled to each memory device 720.

The memory devices 720 may be embodied as any type of memory device capable of storing data for the physical resources 620 during operation of the sled 400, such as any type of volatile (e.g., dynamic random access memory (DRAM), etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A block can be any size such as but not limited to 2 KB, 4 KB, 8 KB, and so forth. A memory device may also include next-generation nonvolatile devices, such as Intel Optane® memory or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, the memory device may comprise a transistor-less stackable cross point architecture in which memory cells sit at the intersection of word lines and bit lines and are individually addressable and in which bit storage is based on a change in bulk resistance.

Figure 8:
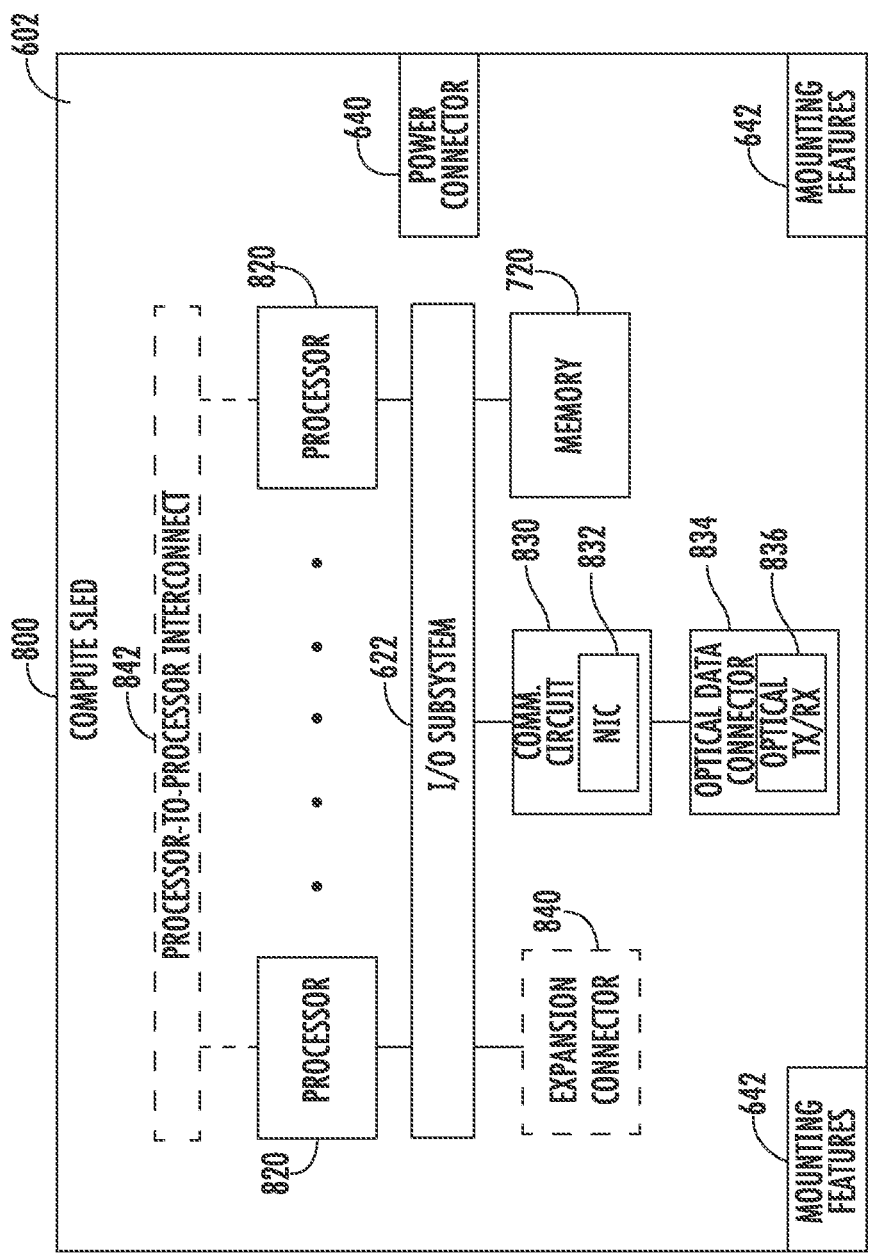
FIG. 8 is a simplified block diagram of at least one embodiment of a compute sled.

Referring now to FIG. 8, in some embodiments, the sled 400 may be embodied as a compute sled 800. The compute sled 800 is optimized, or otherwise configured, to perform compute tasks. Of course, as discussed above, the compute sled 800 may rely on other sleds, such as acceleration sleds and/or storage sleds, to perform such compute tasks. The compute sled 800 includes various physical resources (e.g., electrical components) similar to the physical resources of the sled 400, which have been identified in FIG. 8 using the same reference numbers. The description of such components provided above in regard to FIGS. 6 and 7 applies to the corresponding components of the compute sled 800 and is not repeated herein for clarity of the description of the compute sled 800.

In the illustrative compute sled 800, the physical resources 620 are embodied as processors 820. Although only two processors 820 are shown in FIG. 8, it should be appreciated that the compute sled 800 may include additional processors 820 in other embodiments. Illustratively, the processors 820 are embodied as high-performance processors 820 and may be configured to operate at a relatively high power rating. Although the processors 820 generate additional heat operating at power ratings greater than typical processors (which operate at around 155-230 W), the enhanced thermal cooling characteristics of the chassis-less circuit board substrate 602 discussed above facilitate the higher power operation. For example, in the illustrative embodiment, the processors 820 are configured to operate at a power rating of at least 250 W. In some embodiments, the processors 820 may be configured to operate at a power rating of at least 350 W.

In some embodiments, the compute sled 800 may also include a processor-to-processor interconnect 842. Similar to the resource-to-resource interconnect 624 of the sled 400 discussed above, the processor-to-processor interconnect 842 may be embodied as any type of communication interconnect capable of facilitating processor-to-processor interconnect 842 communications. In the illustrative embodiment, the processor-to-processor interconnect 842 is embodied as a high-speed point-to-point interconnect (e.g., faster than the I/O subsystem 622). For example, the processor-to-processor interconnect 842 may be embodied as a QuickPath Interconnect (QPI), an UltraPath Interconnect (UPI), or other high-speed point-to-point interconnect dedicated to processor-to-processor communications (e.g., PCIe).

The compute sled 800 also includes a communication circuit 830. The illustrative communication circuit 830 includes a network interface controller (NIC) 832, which may also be referred to as a host fabric interface (HFI). The NIC 832 may be embodied as, or otherwise include, any type of integrated circuit, discrete circuits, controller chips, chipsets, add-in-boards, daughtercards, network interface cards, or other devices that may be used by the compute sled 800 to connect with another compute device (e.g., with other sleds 400). In some embodiments, the NIC 832 may be embodied as part of a system-on-a-chip (SoC) that includes one or more processors, or included on a multichip package that also contains one or more processors. In some embodiments, the NIC 832 may include a local processor (not shown) and/or a local memory (not shown) that are both local to the NIC 832. In such embodiments, the local processor of the NIC 832 may be capable of performing one or more of the functions of the processors 820. Additionally or alternatively, in such embodiments, the local memory of the NIC 832 may be integrated into one or more components of the compute sled at the board level, socket level, chip level, and/or other levels. In some examples, a network interface includes a network interface controller or a network interface card. In some examples, a network interface can include one or more of a network interface controller (NIC) 832, a host fabric interface (HFI), a host bus adapter (HBA), network interface connected to a bus or connection (e.g., PCIe, CXL, DDR, and so forth). In some examples, a network interface can be part of a switch or a system-on-chip (SoC).

The communication circuit 830 is communicatively coupled to an optical data connector 834. The optical data connector 834 is configured to mate with a corresponding optical data connector of the rack 240 when the compute sled 800 is mounted in the rack 240. Illustratively, the optical data connector 834 includes a plurality of optical fibers which lead from a mating surface of the optical data connector 834 to an optical transceiver 836. The optical transceiver 836 is configured to convert incoming optical signals from the rack-side optical data connector to electrical signals and to convert electrical signals to outgoing optical signals to the rack-side optical data connector. Although shown as forming part of the optical data connector 834 in the illustrative embodiment, the optical transceiver 836 may form a portion of the communication circuit 830 in other embodiments.

In some embodiments, the compute sled 800 may also include an expansion connector 840. In such embodiments, the expansion connector 840 is configured to mate with a corresponding connector of an expansion chassis-less circuit board substrate to provide additional physical resources to the compute sled 800. The additional physical resources may be used, for example, by the processors 820 during operation of the compute sled 800. The expansion chassis-less circuit board substrate may be substantially similar to the chassis-less circuit board substrate 602 discussed above and may include various electrical components mounted thereto. The particular electrical components mounted to the expansion chassis-less circuit board substrate may depend on the intended functionality of the expansion chassis-less circuit board substrate. For example, the expansion chassis-less circuit board substrate may provide additional compute resources, memory resources, and/or storage resources. As such, the additional physical resources of the expansion chassis-less circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits.

Figure 9:
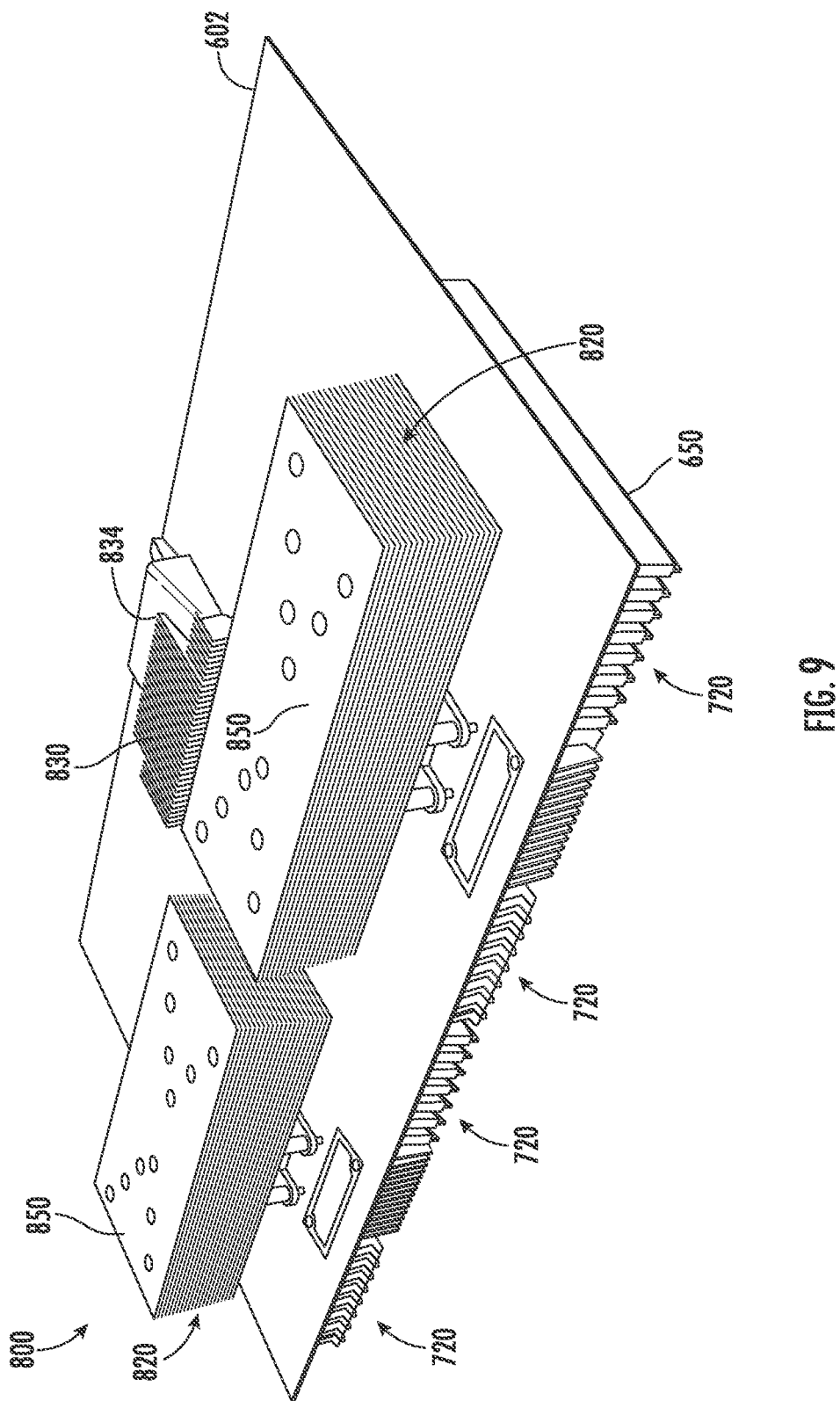
FIG. 9 is a top perspective view of at least one embodiment of a compute sled.

Referring now to FIG. 9, an illustrative embodiment of the compute sled 800 is shown. As shown, the processors 820, communication circuit 830, and optical data connector 834 are mounted to the top side 650 of the chassis-less circuit board substrate 602. Any suitable attachment or mounting technology may be used to mount the physical resources of the compute sled 800 to the chassis-less circuit board substrate 602. For example, the various physical resources may be mounted in corresponding sockets (e.g., a processor socket), holders, or brackets. In some cases, some of the electrical components may be directly mounted to the chassis-less circuit board substrate 602 via soldering or similar techniques.

As discussed above, the individual processors 820 and communication circuit 830 are mounted to the top side 650 of the chassis-less circuit board substrate 602 such that no two heat-producing, electrical components shadow each other. In the illustrative embodiment, the processors 820 and communication circuit 830 are mounted in corresponding locations on the top side 650 of the chassis-less circuit board substrate 602 such that no two of those physical resources are linearly in-line with others along the direction of the airflow path 608. It should be appreciated that, although the optical data connector 834 is in-line with the communication circuit 830, the optical data connector 834 produces no or nominal heat during operation.

The memory devices 720 of the compute sled 800 are mounted to the bottom side 750 of the of the chassis-less circuit board substrate 602 as discussed above in regard to the sled 400. Although mounted to the bottom side 750, the memory devices 720 are communicatively coupled to the processors 820 located on the top side 650 via the I/O subsystem 622. Because the chassis-less circuit board substrate 602 is embodied as a double-sided circuit board, the memory devices 720 and the processors 820 may be communicatively coupled by one or more vias, connectors, or other mechanisms extending through the chassis-less circuit board substrate 602. Of course, each processor 820 may be communicatively coupled to a different set of one or more memory devices 720 in some embodiments. Alternatively, in other embodiments, each processor 820 may be communicatively coupled to each memory device 720. In some embodiments, the memory devices 720 may be mounted to one or more memory mezzanines on the bottom side of the chassis-less circuit board substrate 602 and may interconnect with a corresponding processor 820 through a ball-grid array.

Each of the processors 820 includes a heatsink 850 secured thereto. Due to the mounting of the memory devices 720 to the bottom side 750 of the chassis-less circuit board substrate 602 (as well as the vertical spacing of the sleds 400 in the corresponding rack 240), the top side 650 of the chassis-less circuit board substrate 602 includes additional "free" area or space that facilitates the use of heatsinks 850 having a larger size relative to traditional heatsinks used in typical servers. Additionally, due to the improved thermal cooling characteristics of the chassis-less circuit board substrate 602, none of the processor heatsinks 850 include cooling fans attached thereto. That is, each of the heatsinks 850 is embodied as a fan-less heatsink. In some embodiments, the heat sinks 850 mounted atop the processors 820 may overlap with the heat sink attached to the communication circuit 830 in the direction of the airflow path 608 due to their increased size, as illustratively suggested by FIG. 9.

Figure 10:
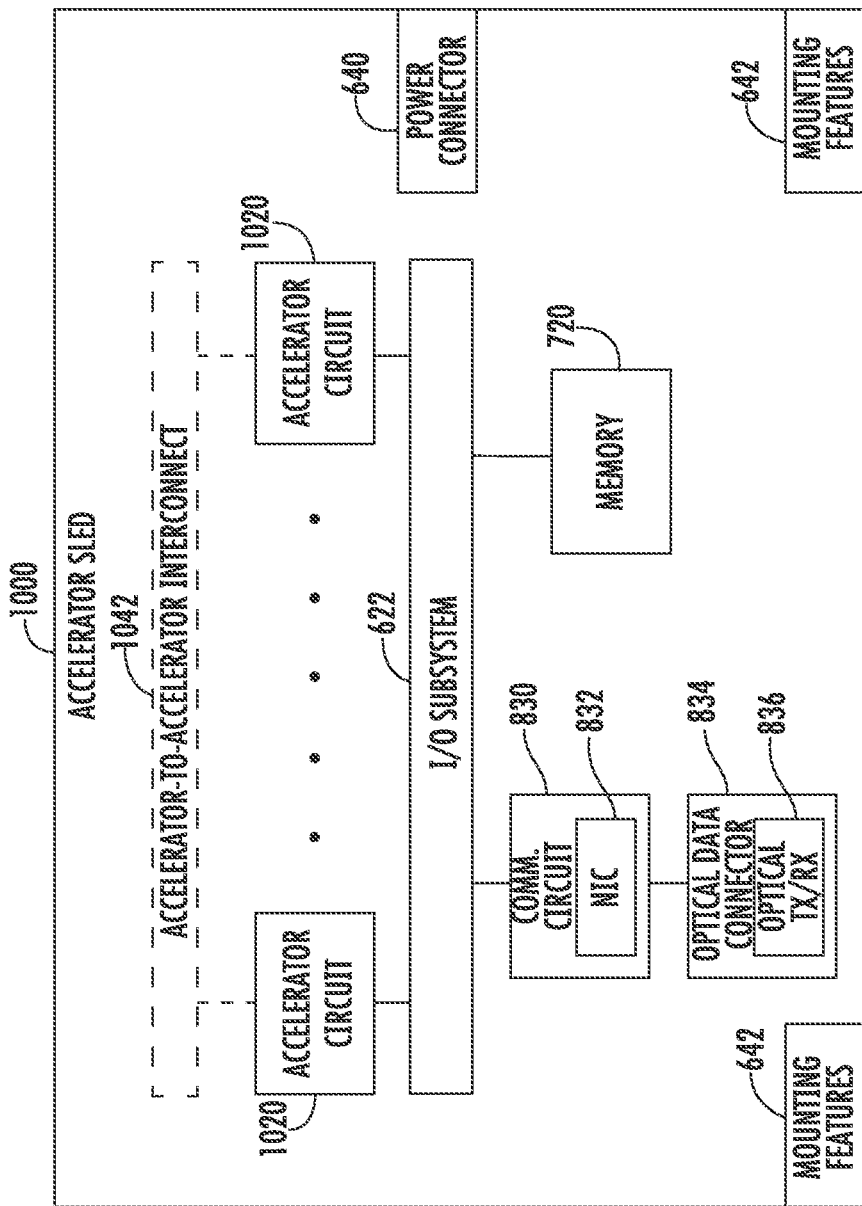
FIG. 10 is a simplified block diagram of at least one embodiment of an accelerator sled usable in a data center.

Referring now to FIG. 10, in some embodiments, the sled 400 may be embodied as an accelerator sled 1000. The accelerator sled 1000 is configured, to perform specialized compute tasks, such as machine learning, encryption, hashing, or other computational-intensive task. In some embodiments, for example, a compute sled 800 may offload tasks to the accelerator sled 1000 during operation. The accelerator sled 1000 includes various components similar to components of the sled 400 and/or compute sled 800, which have been identified in FIG. 10 using the same reference numbers. The description of such components provided above in regard to FIGS. 6, 7, and 8 apply to the corresponding components of the accelerator sled 1000 and is not repeated herein for clarity of the description of the accelerator sled 1000.

Figure 11:
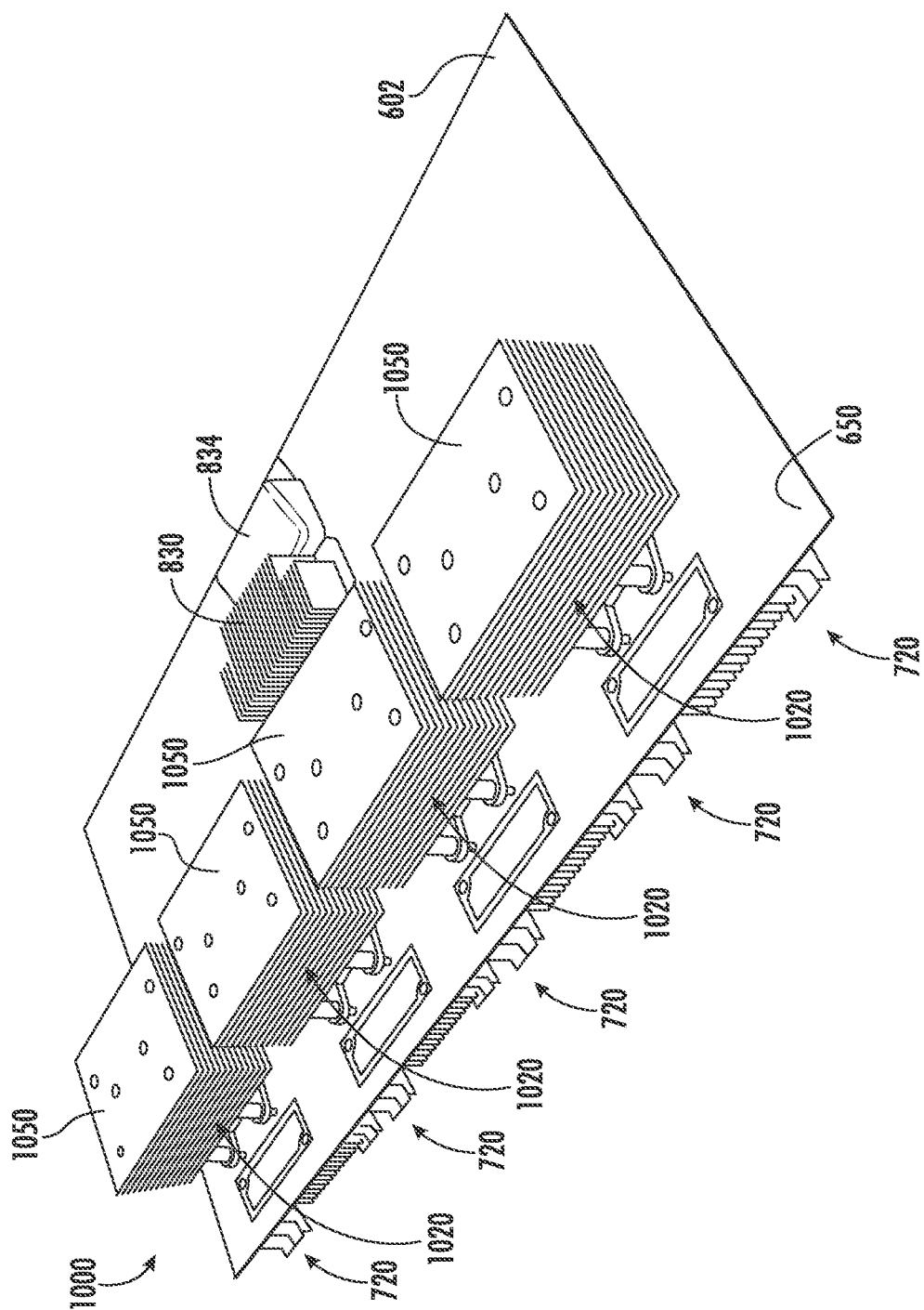
FIG. 11 is a top perspective view of at least one embodiment of an accelerator sled.

In the illustrative accelerator sled 1000, the physical resources 620 are embodied as accelerator circuits 1020. Although only two accelerator circuits 1020 are shown in FIG. 10, it should be appreciated that the accelerator sled 1000 may include additional accelerator circuits 1020 in other embodiments. For example, as shown in FIG. 11, the accelerator sled 1000 may include four accelerator circuits 1020 in some embodiments. The accelerator circuits 1020 may be embodied as any type of processor, co-processor, compute circuit, or other device capable of performing compute or processing operations. For example, the accelerator circuits 1020 may be embodied as, for example, central processing units, cores, field programmable gate arrays (FPGA), application-specific integrated circuits (ASICs), programmable control logic (PCL), security co-processors, graphics processing units (GPUs), neuromorphic processor units, quantum computers, machine learning circuits, or other specialized processors, controllers, devices, and/or circuits.

In some embodiments, the accelerator sled 1000 may also include an accelerator-to-accelerator interconnect 1042. Similar to the resource-to-resource interconnect 624 of the sled 600 discussed above, the accelerator-to-accelerator interconnect 1042 may be embodied as any type of communication interconnect capable of facilitating accelerator-to-accelerator communications. In the illustrative embodiment, the accelerator-to-accelerator interconnect 1042 is embodied as a high-speed point-to-point interconnect (e.g., faster than the I/O subsystem 622). For example, the accelerator-to-accelerator interconnect 1042 may be embodied as a QuickPath Interconnect (QPI), an UltraPath Interconnect (UPI), or other high-speed point-to-point interconnect dedicated to processor-to-processor communications. In some embodiments, the accelerator circuits 1020 may be daisy-chained with a primary accelerator circuit 1020 connected to the NIC 832 and memory 720 through the I/O subsystem 622 and a secondary accelerator circuit 1020 connected to the NIC 832 and memory 720 through a primary accelerator circuit 1020.

Referring now to FIG. 11, an illustrative embodiment of the accelerator sled 1000 is shown. As discussed above, the accelerator circuits 1020, communication circuit 830, and optical data connector 834 are mounted to the top side 650 of the chassis-less circuit board substrate 602. Again, the individual accelerator circuits 1020 and communication circuit 830 are mounted to the top side 650 of the chassis-less circuit board substrate 602 such that no two heat-producing, electrical components shadow each other as discussed above. The memory devices 720 of the accelerator sled 1000 are mounted to the bottom side 750 of the of the chassis-less circuit board substrate 602 as discussed above in regard to the sled 600. Although mounted to the bottom side 750, the memory devices 720 are communicatively coupled to the accelerator circuits 1020 located on the top side 650 via the I/O subsystem 622 (e.g., through vias). Further, each of the accelerator circuits 1020 may include a heatsink 1070 that is larger than a traditional heatsink used in a server. As discussed above with reference to the heatsinks 870, the heatsinks 1070 may be larger than traditional heatsinks because of the "free" area provided by the memory resources 720 being located on the bottom side 750 of the chassis-less circuit board substrate 602 rather than on the top side 650.

Figure 12:
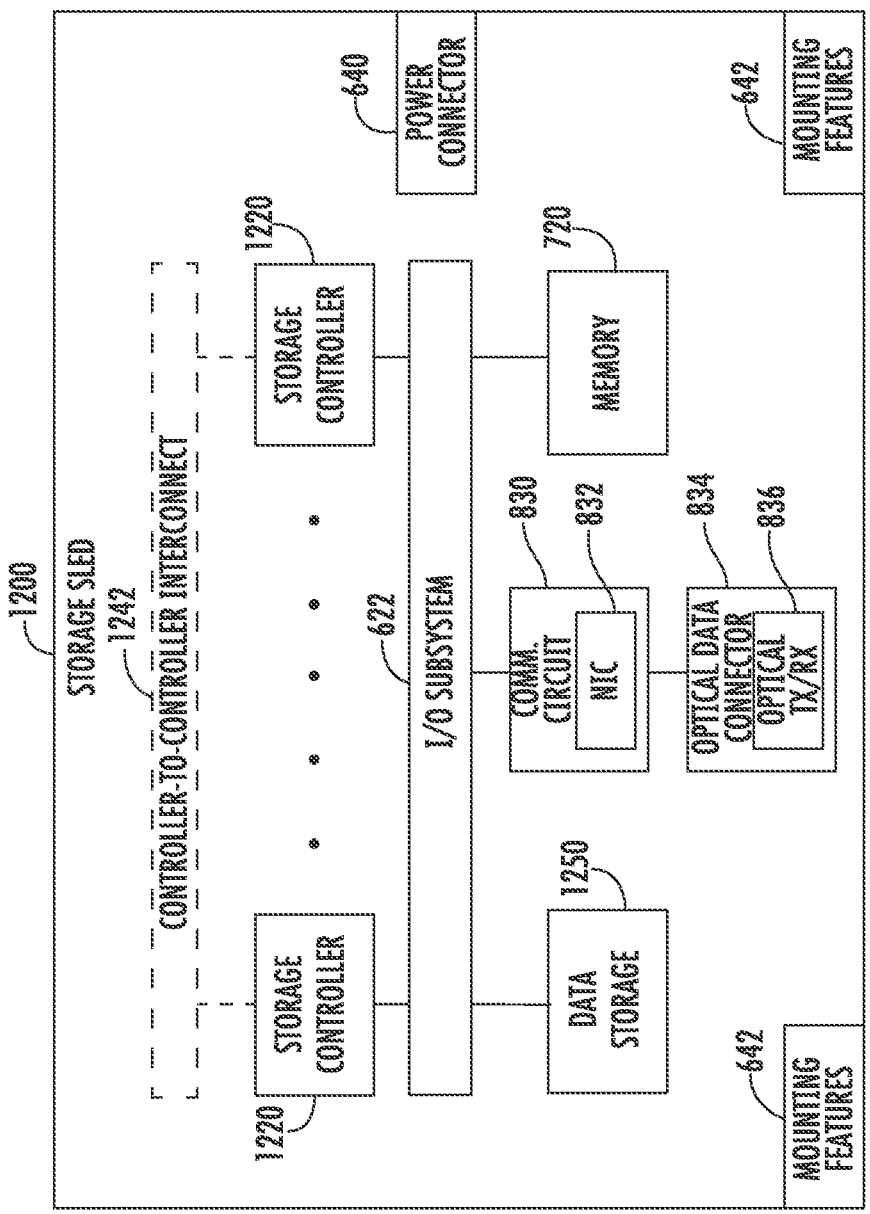
FIG. 12 is a simplified block diagram of at least one embodiment of a storage sled usable in a data center.

Referring now to FIG. 12, in some embodiments, the sled 400 may be embodied as a storage sled 1200. The storage sled 1200 is configured, to store data in a data storage 1250 local to the storage sled 1200. For example, during operation, a compute sled 800 or an accelerator sled 1000 may store and retrieve data from the data storage 1250 of the storage sled 1200. The storage sled 1200 includes various components similar to components of the sled 400 and/or the compute sled 800, which have been identified in FIG. 12 using the same reference numbers. The description of such components provided above with regard to FIGS. 6, 7, and 8 apply to the corresponding components of the storage sled 1200 and is not repeated herein for clarity of the description of the storage sled 1200.

In the illustrative storage sled 1200, the physical resources 620 are embodied as storage controllers 1220. Although only two storage controllers 1220 are shown in FIG. 12, it should be appreciated that the storage sled 1200 may include additional storage controllers 1220 in other embodiments. The storage controllers 1220 may be embodied as any type of processor, controller, or control circuit capable of controlling the storage and retrieval of data into the data storage 1250 based on requests received via the communication circuit 830. In the illustrative embodiment, the storage controllers 1220 are embodied as relatively low-power processors or controllers. For example, in some embodiments, the storage controllers 1220 may be configured to operate at a power rating of about 75 watts.

In some embodiments, the storage sled 1200 may also include a controller-to-controller interconnect 1242. Similar to the resource-to-resource interconnect 624 of the sled 400 discussed above, the controller-to-controller interconnect 1242 may be embodied as any type of communication interconnect capable of facilitating controller-to-controller communications. In the illustrative embodiment, the controller-to-controller interconnect 1242 is embodied as a high-speed point-to-point interconnect (e.g., faster than the I/O subsystem 622). For example, the controller-to-controller interconnect 1242 may be embodied as a QuickPath Interconnect (QPI), an UltraPath Interconnect (UPI), or other high-speed point-to-point interconnect dedicated to processor-to-processor communications.

Figure 13:
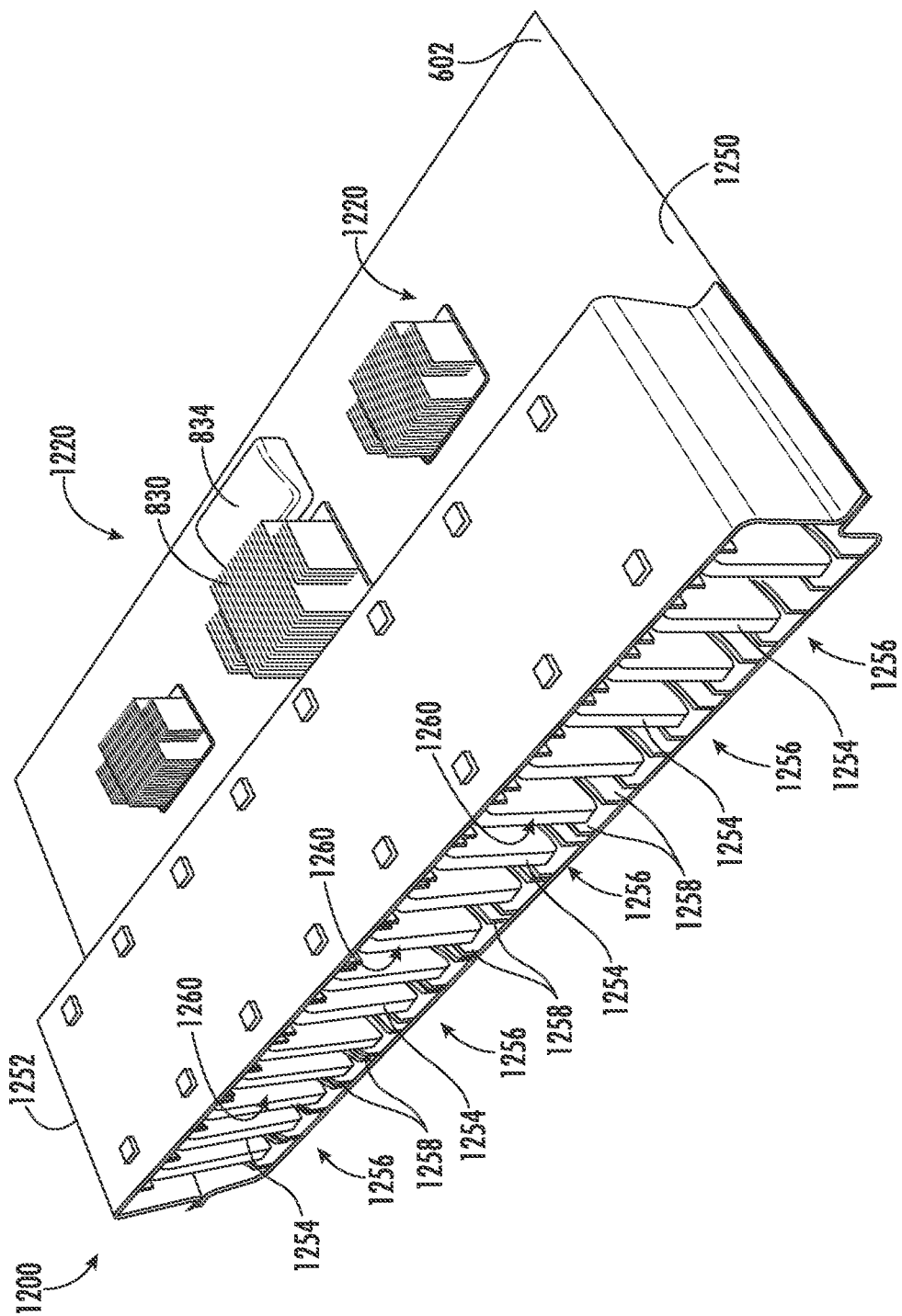
FIG. 13 is a top perspective view of at least one embodiment of a storage sled.

Referring now to FIG. 13, an illustrative embodiment of the storage sled 1200 is shown. In the illustrative embodiment, the data storage 1250 is embodied as, or otherwise includes, a storage cage 1252 configured to house one or more solid state drives (SSDs) 1254. To do so, the storage cage 1252 includes a number of mounting slots 1256, each of which is configured to receive a corresponding solid state drive 1254. Each of the mounting slots 1256 includes a number of drive guides 1258 that cooperate to define an access opening 1260 of the corresponding mounting slot 1256. The storage cage 1252 is secured to the chassis-less circuit board substrate 602 such that the access openings face away from (e.g., toward the front of) the chassis-less circuit board substrate 602. As such, solid state drives 1254 are accessible while the storage sled 1200 is mounted in a corresponding rack 204. For example, a solid state drive 1254 may be swapped out of a rack 240 (e.g., via a robot) while the storage sled 1200 remains mounted in the corresponding rack 240.

The storage cage 1252 illustratively includes sixteen mounting slots 1256 and is capable of mounting and storing sixteen solid state drives 1254. Of course, the storage cage 1252 may be configured to store additional or fewer solid state drives 1254 in other embodiments. Additionally, in the illustrative embodiment, the solid state drivers are mounted vertically in the storage cage 1252, but may be mounted in the storage cage 1252 in a different orientation in other embodiments. Each solid state drive 1254 may be embodied as any type of data storage device capable of storing long term data. To do so, the solid state drives 1254 may include volatile and non-volatile memory devices discussed above.

As shown in FIG. 13, the storage controllers 1220, the communication circuit 830, and the optical data connector 834 are illustratively mounted to the top side 650 of the chassis-less circuit board substrate 602. Again, as discussed above, any suitable attachment or mounting technology may be used to mount the electrical components of the storage sled 1200 to the chassis-less circuit board substrate 602 including, for example, sockets (e.g., a processor socket), holders, brackets, soldered connections, and/or other mounting or securing techniques.

As discussed above, the individual storage controllers 1220 and the communication circuit 830 are mounted to the top side 650 of the chassis-less circuit board substrate 602 such that no two heat-producing, electrical components shadow each other. For example, the storage controllers 1220 and the communication circuit 830 are mounted in corresponding locations on the top side 650 of the chassis-less circuit board substrate 602 such that no two of those electrical components are linearly in-line with each other along the direction of the airflow path 608.

The memory devices 720 of the storage sled 1200 are mounted to the bottom side 750 of the of the chassis-less circuit board substrate 602 as discussed above in regard to the sled 400. Although mounted to the bottom side 750, the memory devices 720 are communicatively coupled to the storage controllers 1220 located on the top side 650 via the I/O subsystem 622. Again, because the chassis-less circuit board substrate 602 is embodied as a double-sided circuit board, the memory devices 720 and the storage controllers 1220 may be communicatively coupled by one or more vias, connectors, or other mechanisms extending through the chassis-less circuit board substrate 602. Each of the storage controllers 1220 includes a heatsink 1270 secured thereto. As discussed above, due to the improved thermal cooling characteristics of the chassis-less circuit board substrate 602 of the storage sled 1200, none of the heatsinks 1270 include cooling fans attached thereto. That is, each of the heatsinks 1270 is embodied as a fan-less heatsink.

Figure 14:
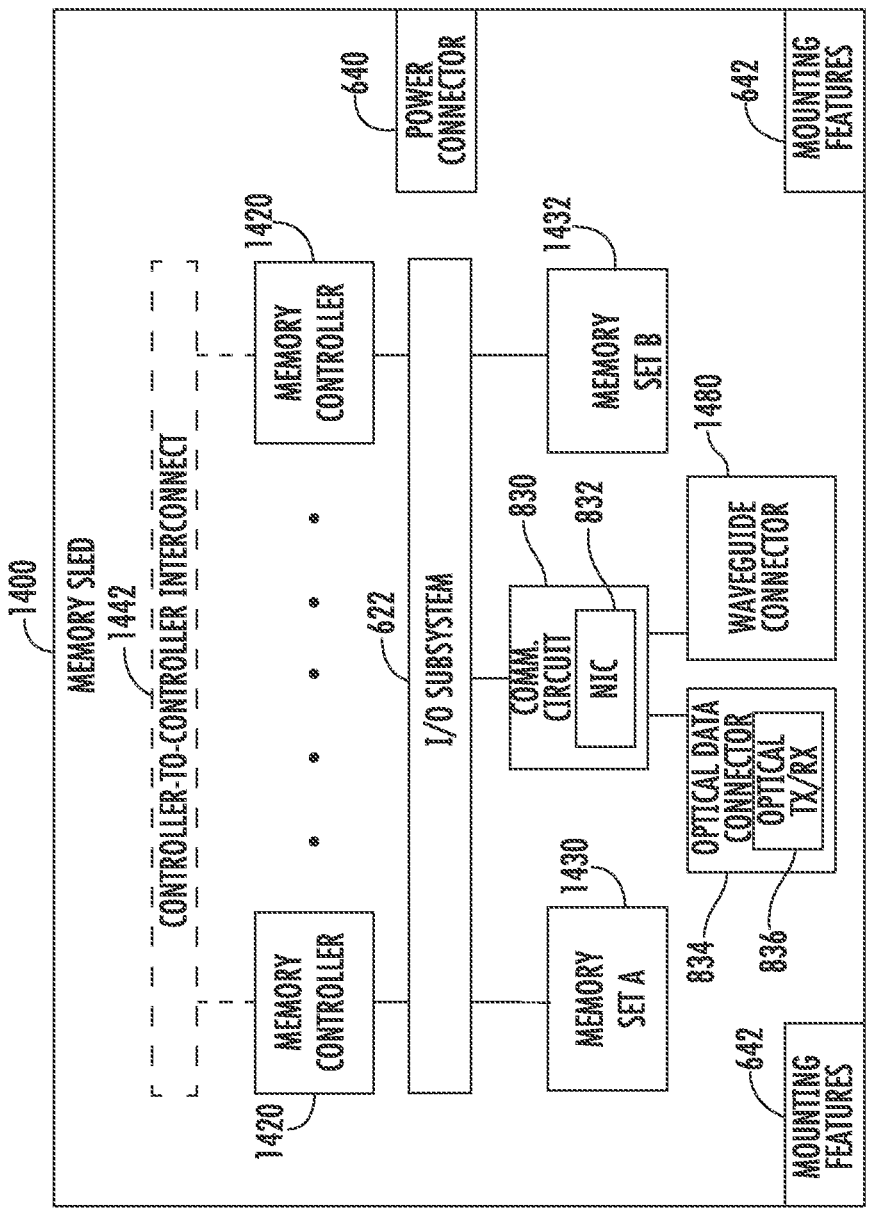
FIG. 14 is a simplified block diagram of at least one embodiment of a memory sled usable in a data center.

Referring now to FIG. 14, in some embodiments, the sled 400 may be embodied as a memory sled 1400. The storage sled 1400 is optimized, or otherwise configured, to provide other sleds 400 (e.g., compute sleds 800, accelerator sleds 1000, etc.) with access to a pool of memory (e.g., in two or more sets 1430, 1432 of memory devices 720) local to the memory sled 1200. For example, during operation, a compute sled 800 or an accelerator sled 1000 may remotely write to and/or read from one or more of the memory sets 1430, 1432 of the memory sled 1200 using a logical address space that maps to physical addresses in the memory sets 1430, 1432. The memory sled 1400 includes various components similar to components of the sled 400 and/or the compute sled 800, which have been identified in FIG. 14 using the same reference numbers. The description of such components provided above in regard to FIGS. 6, 7, and 8 apply to the corresponding components of the memory sled 1400 and is not repeated herein for clarity of the description of the memory sled 1400.

In the illustrative memory sled 1400, the physical resources 620 are embodied as memory controllers 1420. Although only two memory controllers 1420 are shown in FIG. 14, it should be appreciated that the memory sled 1400 may include additional memory controllers 1420 in other embodiments. The memory controllers 1420 may be embodied as any type of processor, controller, or control circuit capable of controlling the writing and reading of data into the memory sets 1430, 1432 based on requests received via the communication circuit 830. In the illustrative embodiment, each memory controller 1420 is connected to a corresponding memory set 1430, 1432 to write to and read from memory devices 720 within the corresponding memory set 1430, 1432 and enforce any permissions (e.g., read, write, etc.) associated with sled 400 that has sent a request to the memory sled 1400 to perform a memory access operation (e.g., read or write).

In some embodiments, the memory sled 1400 may also include a controller-to-controller interconnect 1442. Similar to the resource-to-resource interconnect 624 of the sled 400 discussed above, the controller-to-controller interconnect 1442 may be embodied as any type of communication interconnect capable of facilitating controller-to-controller communications. In the illustrative embodiment, the controller-to-controller interconnect 1442 is embodied as a high-speed point-to-point interconnect (e.g., faster than the I/O subsystem 622). For example, the controller-to-controller interconnect 1442 may be embodied as a QuickPath Interconnect (QPI), an UltraPath Interconnect (UPI), or other high-speed point-to-point interconnect dedicated to processor-to-processor communications. As such, in some embodiments, a memory controller 1420 may access, through the controller-to-controller interconnect 1442, memory that is within the memory set 1432 associated with another memory controller 1420. In some embodiments, a scalable memory controller is made of multiple smaller memory controllers, referred to herein as "chiplets", on a memory sled (e.g., the memory sled 1400). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 1420 may implement a memory interleave (e.g., one memory address is mapped to the memory set 1430, the next memory address is mapped to the memory set 1432, and the third address is mapped to the memory set 1430, etc.). The interleaving may be managed within the memory controllers 1420, or from CPU sockets (e.g., of the compute sled 800) across network links to the memory sets 1430, 1432, and may improve the latency associated with performing memory access operations as compared to accessing contiguous memory addresses from the same memory device.

Further, in some embodiments, the memory sled 1400 may be connected to one or more other sleds 400 (e.g., in the same rack 240 or an adjacent rack 240) through a waveguide, using the waveguide connector 1480. In the illustrative embodiment, the waveguides are 64 millimeter waveguides that provide 16 Rx (e.g., receive) lanes and 16 Tx (e.g., transmit) lanes. Each lane, in the illustrative embodiment, is either 16 GHz or 32 GHz. In other embodiments, the frequencies may be different. Using a waveguide may provide high throughput access to the memory pool (e.g., the memory sets 1430, 1432) to another sled (e.g., a sled 400 in the same rack 240 or an adjacent rack 240 as the memory sled 1400) without adding to the load on the optical data connector 834.

Figure 15:
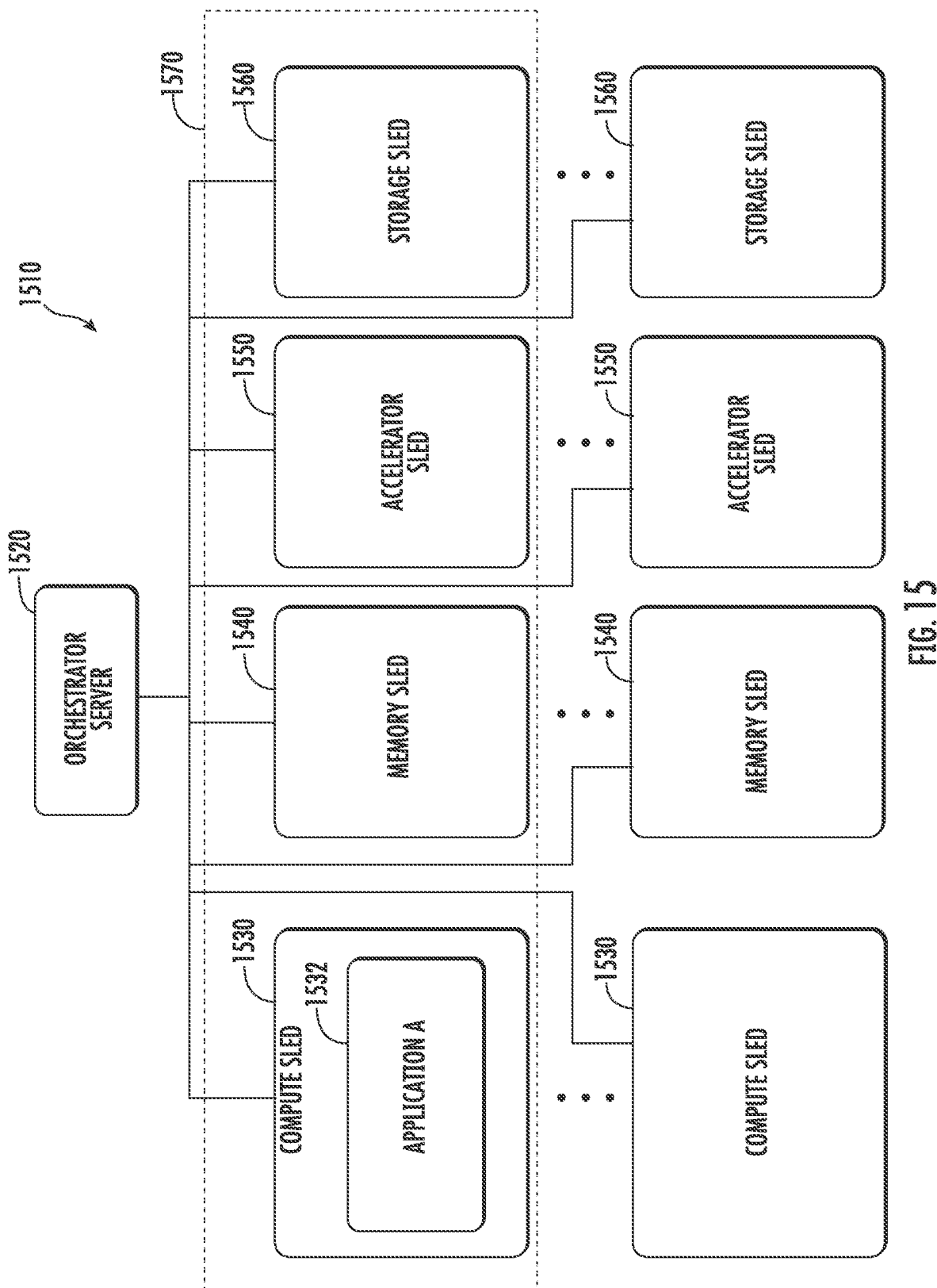
FIG. 15 depicts a system for executing one or more workloads.

Referring now to FIG. 15, a system for executing one or more workloads (e.g., applications) may be implemented in accordance with the data center 100. In the illustrative embodiment, the system 1510 includes an orchestrator server 1520, which may be embodied as a managed node comprising a compute device (e.g., a processor 820 on a compute sled 800) executing management software (e.g., a cloud operating environment, such as OpenStack) that is communicatively coupled to multiple sleds 400 including a large number of compute sleds 1530 (e.g., each similar to the compute sled 800), memory sleds 1540 (e.g., each similar to the memory sled 1400), accelerator sleds 1550 (e.g., each similar to the memory sled 1000), and storage sleds 1560 (e.g., each similar to the storage sled 1200). One or more of the sleds 1530, 1540, 1550, 1560 may be grouped into a managed node 1570, such as by the orchestrator server 1520, to collectively perform a workload (e.g., an application 1532 executed in a virtual machine or in a container). The managed node 1570 may be embodied as an assembly of physical resources 620, such as processors 820, memory resources 720, accelerator circuits 1020, or data storage 1250, from the same or different sleds 400. Further, the managed node may be established, defined, or "spun up" by the orchestrator server 1520 at the time a workload is to be assigned to the managed node or at any other time, and may exist regardless of whether any workloads are presently assigned to the managed node. In the illustrative embodiment, the orchestrator server 1520 may selectively allocate and/or deallocate physical resources 620 from the sleds 400 and/or add or remove one or more sleds 400 from the managed node 1570 as a function of quality of service (QoS) targets (e.g., a target throughput, a target latency, a target number instructions per second, etc.) associated with a service level agreement for the workload (e.g., the application 1532). In doing so, the orchestrator server 1520 may receive telemetry data indicative of performance conditions (e.g., throughput, latency, instructions per second, etc.) in each sled 400 of the managed node 1570 and compare the telemetry data to the quality of service targets to determine whether the quality of service targets are being satisfied. The orchestrator server 1520 may additionally determine whether one or more physical resources may be deallocated from the managed node 1570 while still satisfying the QoS targets, thereby freeing up those physical resources for use in another managed node (e.g., to execute a different workload). Alternatively, if the QoS targets are not presently satisfied, the orchestrator server 1520 may determine to dynamically allocate additional physical resources to assist in the execution of the workload (e.g., the application 1532) while the workload is executing. Similarly, the orchestrator server 1520 may determine to dynamically deallocate physical resources from a managed node if the orchestrator server 1520 determines that deallocating the physical resource would result in QoS targets still being met.

Additionally, in some embodiments, the orchestrator server 1520 may identify trends in the resource utilization of the workload (e.g., the application 1532), such as by identifying phases of execution (e.g., time periods in which different operations, each having different resource utilizations characteristics, are performed) of the workload (e.g., the application 1532) and pre-emptively identifying available resources in the data center 100 and allocating them to the managed node 1570 (e.g., within a predefined time period of the associated phase beginning). In some embodiments, the orchestrator server 1520 may model performance based on various latencies and a distribution scheme to place workloads among compute sleds and other resources (e.g., accelerator sleds, memory sleds, storage sleds) in the data center 100. For example, the orchestrator server 1520 may utilize a model that accounts for the performance of resources on the sleds 400 (e.g., FPGA performance, memory access latency, etc.) and the performance (e.g., congestion, latency, bandwidth) of the path through the network to the resource (e.g., FPGA). As such, the orchestrator server 1520 may determine which resource(s) should be used with which workloads based on the total latency associated with each potential resource available in the data center 100 (e.g., the latency associated with the performance of the resource itself in addition to the latency associated with the path through the network between the compute sled executing the workload and the sled 400 on which the resource is located).

In some embodiments, the orchestrator server 1520 may generate a map of heat generation in the data center 100 using telemetry data (e.g., temperatures, fan speeds, etc.) reported from the sleds 400 and allocate resources to managed nodes as a function of the map of heat generation and predicted heat generation associated with different workloads, to maintain a target temperature and heat distribution in the data center 100. Additionally or alternatively, in some embodiments, the orchestrator server 1520 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 1520 may determine the differences based on the telemetry data stored in the hierarchical model and factor the differences into a prediction of future resource utilization of a workload if the workload is reassigned from one managed node to another managed node, to accurately balance resource utilization in the data center 100. In some embodiments, the orchestrator server 1520 may identify patterns in resource utilization phases of the workloads and use the patterns to predict future resource utilization of the workloads.

To reduce the computational load on the orchestrator server 1520 and the data transfer load on the network, in some embodiments, the orchestrator server 1520 may send self-test information to the sleds 400 to enable each sled 400 to locally (e.g., on the sled 400) determine whether telemetry data generated by the sled 400 satisfies one or more conditions (e.g., an available capacity that satisfies a predefined threshold, a temperature that satisfies a predefined threshold, etc.). Each sled 400 may then report back a simplified result (e.g., yes or no) to the orchestrator server 1520, which the orchestrator server 1520 may utilize in determining the allocation of resources to managed nodes.

Configuration Circuitry Accessible Using a Device Interface

At Ethernet data transfer rates of 10 Gb/second and above, processing of packets received by a network interface can become a bottleneck. In data center networks that support performance acceleration techniques, virtualization, and overlay networks, timely packet processing can become a challenge. Some approaches offload some of the packet processing to the network interface controller (NIC). A NIC can include or be part of a network interface card. In some examples, a NIC can be implemented as part of a system of a chip.

Software-defined networking (SDN) can be applied to modify and manage networks. In some examples, using SDN, a NIC can be reconfigured to support new functions or protocols. For example, SmartNICs can include features of a NIC as well as other packet processing features such as a firewall for security, a layer 2 or 3 switch for traffic steering, performance acceleration techniques, network visibility with remote management, and storage services for a compute host. A SmartNIC can perform one or more local functions as part of a service function chaining (SFC) to process received packets or packets prior to transmission or termination at an endpoint.

Some SmartNICs support bare-metal hosting capability by supporting offload of storage services and networking services. A bare metal server can include a physical server dedicated to a single tenant. The server's tenant can optimize the server according to its needs for performance, security and reliability. An alternative to a bare metal server can include a hypervisor server, in which multiple users share a virtual server's compute, storage and other resources.

Configuration of a SmartNIC can include exposing a memory Base Address Register (BAR) for Memory Mapped IO (MMIO) register space to software or firmware running on a system on a chip (SoC) in the NIC to program the internal registers. A memory BAR-based interface can be used to configure firmware running on an Advanced RISC Machine (ARM)-based system on chip (SoC) in some devices such as a solid-state drive (SSD). MMIO allows interacting with hardware devices by reading from and writing to predefined memory addresses. However, such a design provides very limited capabilities for software, making enabling user space software design based on Storage Performance Development Kit (SPDK) or Data Plane Development Kit (DPDK) frameworks potentially difficult. When the configuration interface is exposed to a different system architecture such as an Intel® Architecture (IA) based host system, where access to the SmartNIC uses an interface such as a Peripheral Component Interconnect express (PCIe), software reuse on a host system that executes Linux operating system (OS) based on PCIe device models can be challenging.

Non-Uniform Memory Access (NUMA) provides for use of memory devices where memory access time depends, in part, on the memory location relative to the processor such that a device can access local memory faster than memory local to another device. NVMe provides for NUMA whereby NVMe host software can create queues and NVMe supports Physical Region Pages (PRPs) or scatter/gather input/outputs (IOs) based commands, to reduce CPU overhead on data transfers. NVMe compatible storage devices can process NVMe commands out of order to reduce data access latencies. NVMe commands and data payload can be transmitted to devices using NVMe over Fabrics (NVMe-oF).

In various embodiments, data reads or writes using remote memory access semantics (e.g., NVMe-oF) can be supported by a SmartNIC. The SmartNIC design can provide a configuration interface for managing the device resources and configurations of an NVMe-oF offload device. For example, NVMe-oF is described at least in NVM Express, Inc., "NVM Express Over Fabrics," Revision 1.0, Jun. 5, 2016, and specifications referenced therein and variations and revisions thereof. A memory device or pool can be remote to a server or host system and connected to the server or host system using a network or fabric, where examples of networks and fabrics are described herein.

When various NVMe-oF capabilities are offloaded to a NIC, various embodiments provide a storage configuration interface circuitry accessible through a device interface (e.g., PCIe interface) to permit management of NVMe-oF operations by software to allow support for vendor specific offload capabilities or control of NVMe-oF functions as a PCIe device in user space (e.g., using VFIO).

Various embodiments provide a storage configuration interface (e.g., NVMe Configuration PF (NVMe CPF)) for at least NVMe or NVMe-oF access operations performed by a SmartNIC. The storage configuration interface may be used by a processor component (e.g., system on chip (SoC)) of a SmartNIC or by a bare-metal host to configure and manage NVMe interfaces (e.g., NVMe PF or NVMe VFs) to enable a host operating system (OS) or virtual machines (VMs) to access remote disaggregated storage. However, various embodiments also permit use of the storage configuration interface by VMs for different tenants.

Various embodiments provide at least a storage configuration interface (e.g., an NVMe PF with or without SR-IOV support) in a SmartNIC to a host server or computing platform. The NVMe interface (e.g., configuration interface) can be exposed to a host server and can serve as a virtual NVMe controller for remote storage namespaces from a storage cluster in a data center. The virtual NVMe controller can be configured for NVMe-oF offload, including, but not limited to, attaching a namespace, configuring NVMe-oF offload tables, and so forth. In some embodiments, storage management and control plane software running on an integrated system-on-a-chip (SoC) or processor component within or coupled to a SmartNIC can use a storage configuration interface to configure the virtual NVMe controller and program NVMe-oF offload related tables.

Various embodiments of the storage configuration interface can be accessible via a PCIe device interface or other device interface described herein. A user space driver leveraging Linux Virtual Function I/O (VFIO) framework can be used to pass-through the PCIe device (e.g., storage configuration interface) for access by a user space application. Various embodiments of storage configuration interface push or copy commands or metadata (e.g., descriptors) into a shadow memory to enable processor component-executed software to process the commands and provide load balancing capability among the mailbox queues that are allocated to the cores or processors in the SoC or processor component.

An operating system (OS) can segregate memory or virtual memory into kernel space and user space to provide memory protection and hardware protection from malicious or errant software behavior. User space can be memory allocated to running applications and some drivers. Processes running under user space may have access to a limited part of memory, whereas the kernel may have access to all of the memory. Kernel space can be memory allocated to the kernel, kernel extensions, some device drivers and the operating system. A kernel can manage applications running in user space. Kernel space can be a location where the code of the kernel is stored and executes within.

Various embodiments provide a PCIe device exposed to processor component (e.g., an SoC integrated into a network interface or SmartNIC). The PCIe device can be re-assignable to a host computing system when the processor component is inactive or removed so that the host computing system can configure or communicate with the SmartNIC to initiate or receive responses to NVMe-oF compatible storage-related commands.

Figure 16:
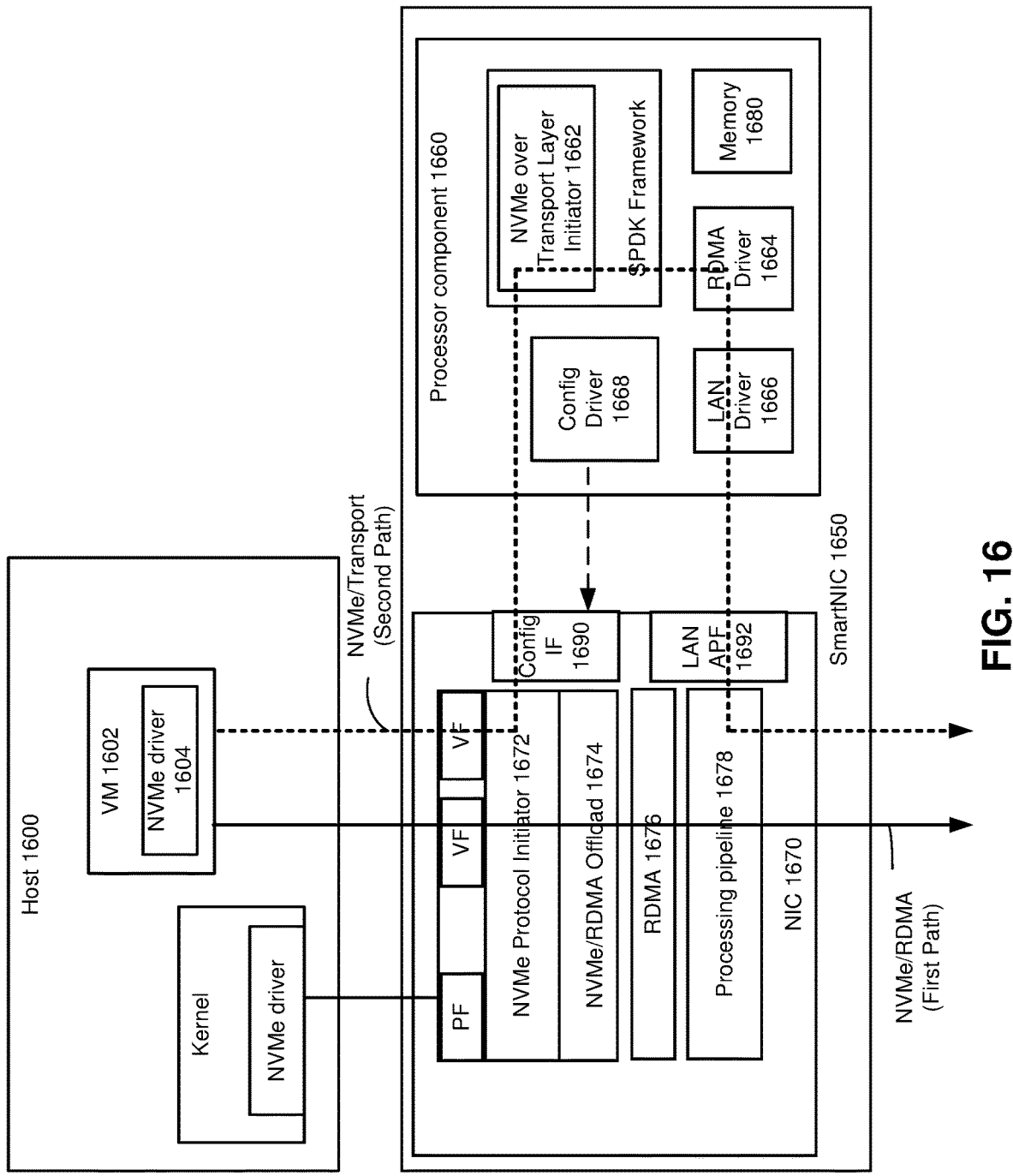
FIG. 16 depicts an example of a system that offloads generation of NVMe-oF transactions to a SmartNIC.

FIG. 16 depicts an example of a system that offloads generation of NVMe-oF transactions to a SmartNIC. Host 1600 can be implemented as a server, rack of servers, computing platform, or other devices. In some examples, host 1600 can include one or more of: a core, graphics processing unit (GPU), field programmable gate array (FPGA), or application specific integrated circuit (ASIC). In some examples, a core can be sold or designed by Intel®, ARM®, AMD®, Qualcomm®, IBM®, Texas Instruments®, among others. Cores can execute an operating system, driver, applications, and/or a virtual machine (VM) 1602. In some examples, an operating system (OS) can be Linux®, Windows®, FreeBSD®, Android®, MacOS®, iOS®, or any other operating system. Host 1600 can include a memory such as one or more of volatile memory (e.g., cache or DRAM), non-volatile memory, or persistent memory.

In some examples, an application executing in a virtual machine (VM) 1602 can utilize an application program interface (API) to negotiate with a cloud service provider (CSP) as to a type of drive available for data storage and access. A CSP can attach at least one or more namespaces to the drive available to the application or VM. Note that virtual machines can also refer to containers or any software that share a computing platform. Any processor can execute a shared resource environment such as a virtual machine or a container. A virtual machine can be software that runs an operating system and one or more applications. A virtual machine can be defined by specification, configuration files, virtual disk file, non-volatile random access memory (NVRAM) setting file, and the log file and is backed by the physical resources of a host computing platform. A container can be a software package of applications, configurations and dependencies so the applications run reliably on one computing environment to another. Containers can share an operating system installed on the server platform and run as isolated processes.

Virtual machine (VM) 1602 can request access to a local storage device or remote storage device using NVMe driver 1604. Other drivers can be executed such as a driver for SmartNIC 1650 or other devices. Some examples of SmartNIC 1650 can provide a storage interface whereby a tenant (e.g., VM 1602) can access available storage over a network or fabric through SmartNIC 1650 in accordance with NVMe-oF. Various embodiments allow configuration of a virtual function (VF) where addressable memory regions of remote storage are identified using at least a namespace for a VF and RDMA queue pair.

SmartNIC 1650 can include processor component 1660 and NIC subsystem 1670. Processor component 1660 and NIC subsystem 1670 can be physically positioned in a same SmartNIC and connected using a motherboard and interface or bus or formed within a same system on chip (SoC). Processor component 1660 can include processor components and memory devices, examples of which are provided herein. In some examples, SmartNIC 1650 can generate and transmit NVMe-oF transactions using a first path using NIC 1670 that is at least partially hardware-based offload to generate and transmit NVMe commands over RDMA or using a second path using processor component 1660 to generate and transmit NVMe commands over any configured transport layer. NVMe-oF commands can be sent through different transport layers such as FibreChannel, InfiniBand, RoCE, RoCEv2, iWARP, transmission control protocol (TCP), and so forth. Transport layers may extend to leverage User Data Protocol (UDP), quick UDP Internet Connections (QUIC), and so forth. In some examples, NIC 1670 and/or processor component 1660 can generate storage access commands to be sent using Internet Small Computer Systems Interface (iSCSI) or a proprietary protocol. NVMe-oF enables transmission of NVMe commands to a remote device using a network or fabric. Using NVMe-oF over RDMA can leverage any of the RDMA technologies, including InfiniB and, RoCE and iWARP, and others. Note that the first path (e.g., NIC 1670) can be configured to generate NVMe-oF using any type of transport layer or semantics.

RDMA can involve direct writes or reads to copy content of buffers across a connection without the operating system managing the copies. A network interface card or other interface to a connection can implement a direct memory access engine and create a channel from its RDMA engine though a bus to application memory. A send queue and receive queue can be used to transfer work requests and are referred to as a Queue Pair (QP). A requester can place work request instructions on its work queues that tells the interface contents of what buffers to send to or receive content from. A work request can include an identifier (e.g., pointer or memory address of a buffer). For example, a work request placed on a send queue (SQ) can include an identifier of a message or content in a buffer (e.g., app buffer) to be sent. By contrast, an identifier in a work request in a Receive Queue (RQ) can include a pointer to a buffer (e.g., app buffer) where content of an incoming message can be stored. An RQ can be used to receive an RDMA-based command or RDMA-based response. A Completion Queue (CQ) can be used to notify when the instructions placed on the work queues have been completed.

In some examples, NIC 1670 can generate and transmit NVMe commands over RDMA using NVMe protocol interface (NPI) 1672, NVMe/RDMA offload 1674, RDMA layer 1676, and a processing pipeline 1678. For namespaces assigned to NPI 1672, NPI 1672 can translate NVMe commands into NVMe-oF commands and bypass processor component 1660. For namespaces assigned to the processor component 1660, storage configuration interface 1690 can copy commands and metadata with identifiers of the commands to memory 1680 and processor component 1660 can access the metadata to identify commands in memory 1680 to translate NVMe command into NVMe-oF commands and perform applicable processing and header generation.

Various embodiments can support NVMe over TCP flow in which commands are forwarded to processor component 1660 for processing (e.g., using software and/or hardware) and then sending the NVMe-oF commands using the TCP/IP networking stack running on processor component 1660. For NVMe over TCP flows, NVMe commands from host 1600 can be routed to processor component 1660, so that software executing on processor component 1660 can perform processing and execute a networking stack to prepare NVMe over TCP commands to a remote target system. This can be a compute intensive processing flow, where multiple CPUs/cores may be used to deliver a high Input/Output Operations Per Second (IOPS) solution.

In some examples, processor component 1660 can generate and transmit NVMe commands over a configured transport layer using NVMe over transport layer initiator 1662, RDMA driver 1664, and local area network (LAN) driver 1666. In some examples, processor component 1660 can perform particular packet processing operations (e.g., cryptography, compression or cyclic redundancy check (CRC)). RDMA driver 1664 and LAN driver 1666 can provide a network protocol stack to form packets for transmission by SmartNIC 1650 to a destination address associated with a destination NVMe drive. Local area network (LAN) Advanced Policy Firewall (APF) 1692 can provide network address translation (NAT), egress filtering, or field modification.

In some examples, NIC 1670 can be configured using a storage configuration interface (Config IF) 1690 by configuration driver 1668 executing on processor component 1660. In some examples, configuration driver 1668 can be executed on host 1600 instead of processor component 1660. For example, configuration driver 1668 can run in user space (e.g., on top of an SPDK or DPDK framework). For example, configuration driver 1668 can configure storage configuration interface 1690 to attach namespaces to an NVMe storage device associated with a VF or PF. Configuration driver 1668 can enable NPI 1672 to perform NVMe command generation for certain destination namespaces or offload to processor component 1660 to perform NVMe command generation for other destination namespaces. In some examples, storage configuration interface 1690 is used to configure and manage Hyper-Converged storage usage in which both NVMe-oF initiator and NVMe-oF target.

Storage configuration interface 1690 can attach an NVMe namespace to an NVMe PF or a VF. In some examples, host system 1600 can access an NVMe namespace attached to a PF or VF. The namespace can be created from local memory (e.g., memory 1680) or local SSDs attached to SmartNIC 1650 using PCIe interface (e.g., NVMe SSDs of FIG. 17A), or remotely connected to SmartNIC 1650 using a network or fabric (e.g., using a network cable or via one or more forwarding elements). For example, NVMe namespaces can be associated with remote storage devices or nodes accessible via a network or fabric.

Storage configuration interface 1690 can be implemented as a device coupled to the SmartNIC and/or server system using a PCIe interface. Storage configuration interface 1690 can appear as a PCIe device to processors of processor component 1660 or host 1600. PCIe-related features of a device interface of storage configuration interface 1690 can be accessed in connection with performing NVMe commands. For example, NVMe commands can include: read, write, flush, and so forth. A PCIe device interface for storage configuration interface 1690 can provide at least the following capabilities: (a) a memory BAR to configure internal registers and offload tables, (b) Message Signaled Interrupts (MSI-X) and interrupt notifications to processor component 1660 for mailbox queues and device exceptions/events, (c) mailbox queues/groups for passing commands and events to processor component 1660, with load balancing capability among the mailbox queues in a same group for scalability, (d) pushing commands and metadata (e.g., command pointers in memory) sent to NPI 1672 also to a shadow memory 1680 for direct access by processor component 1660. For example, software running on processor component 1660 can include a NVMe protocol interface transport layer using an SPDK, DPDK, or OpenDataPlane framework. Execution of configuration driver 1668 on processor component 1660 can allow use of multiple hosts (e.g., server) that do not execute configuration driver 1668 so that in an event of failure of any host that runs configuration driver 1668, configuration of storage configuration interface 1690 is not interrupted. Storage configuration interface 1690 can be exposed as a PCIe function to processor component 1660, and this PCIe function can be re-assigned to host platform 1600 when the processor component 1660 is inactive or removed.

For example, a mailbox queue can be allocated per core or group of one or more cores. A mailbox queue can be allocated in memory 1680 or other memory accessible to host 1600 or NIC 1670. A mailbox queue can be used to pass commands from NIC 1670 to processor component 1660 or pass commands from processor component 1660 to NIC 1670. A mailbox queue can be a ring structure for passing the commands or meta data to memory 1680. Mailbox entries written into these mailbox queues can include a phase bit which toggles if the ring wraps over to allow software to identify if an entry is valid without having to read the mailbox's corresponding tail pointer. In a target offload case, mailbox queues can be used for passing exception commands from NIC 1670 to software run by processor component 1660 for assisted processing.

Storage configuration interface 1690 can provide load balancing capability among the mailbox queues. The load balancing can include a round robin selection of NVMe commands among the queues. Commands directed to a specific namespace can be directed to a specific mailbox queue. In some examples, read commands and write commands (or other commands) can be separated into different mailbox queues. For multi-host and different quality of service (QoS) level support, mailbox queues can be configured into different groups associated with different QoS levels. Commands for a specific namespace can be routed to a specific mailbox group and within a mailbox group, load balancing can be applied among the mailbox queues to balance allocation of commands among the mailbox queues.

Memory 1680 can store commands received from host 1600 or received from a requester. For example, a command can be approximately 128B in size or other sizes. Storage configuration interface 1690 can push the commands provided to NPI 1672 into memory 1680 to allow software executing on processor component 1660 to directly access the commands instead of issuing register reads to the NPI 1672.

Use of storage configuration interface 1690 can reduce software engineering investment because a PCIe based device model (or other device interface) can simplify software design and support SPDK or DPDK based software development by using VFIO to pass-through configuration and command of a PCIe device (or other device interface) to a user space application. PCIe device exposure can permit software re-use in user space (e.g., software to run on either host server 1600 or processor component 1660).

An interface between processor component 1660 and storage configuration interface 1690 can be one or more of: PCIe, ARM AXI, Intel® QuickPath Interconnect (QPI), Intel® Ultra Path Interconnect (UPI), Intel® On-Chip System Fabric (IOSF), Omnipath, Ethernet, Compute Express Link (CXL), HyperTransport, NVLink, Advanced Microcontroller Bus Architecture (AMBA) interconnect, Open-CAPI, Gen-Z, CCIX, Infinity Fabric (IF), and so forth.

Figure 17A:
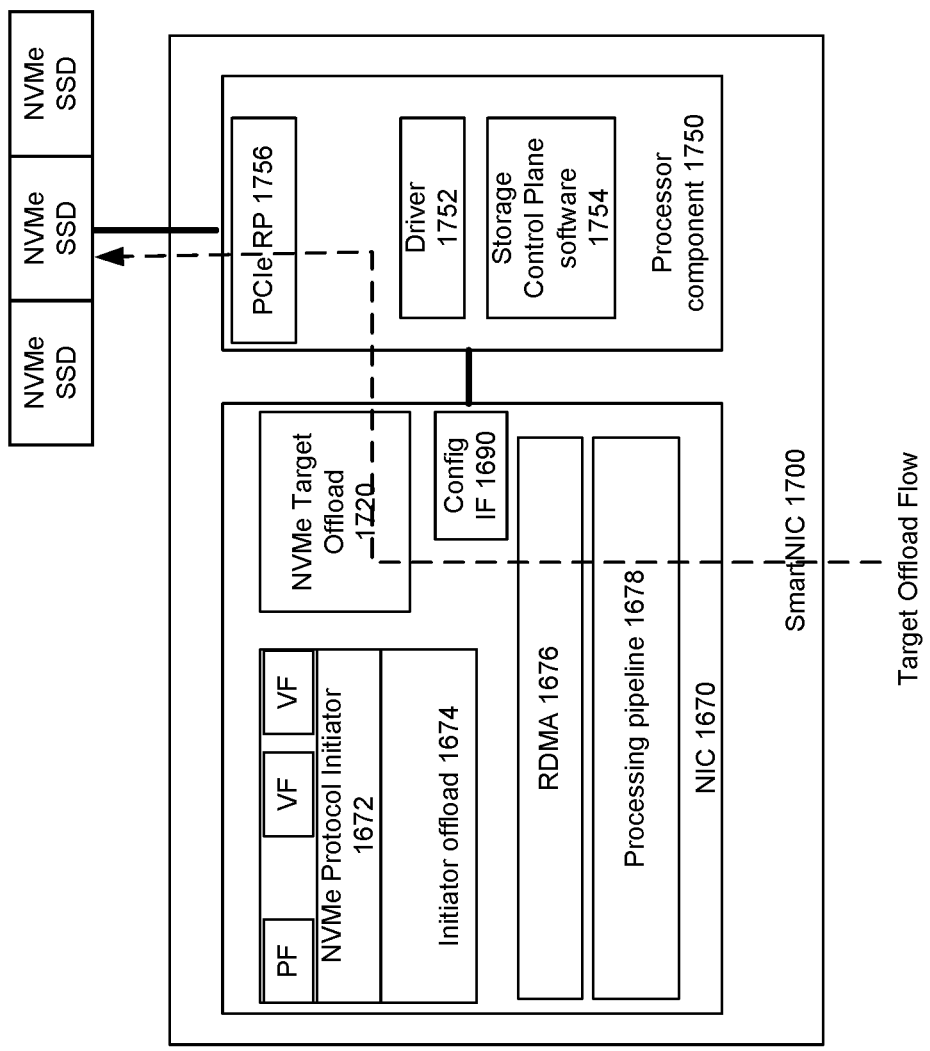
FIG. 17A depicts an example system.

FIG. 17A illustrates a system view of target offload usage where a storage configuration interface is used to configure a target offload hardware block to enable target offload to one or more NVMe compatible solid state drives (SSDs) connected to the SmartNIC. Note that a SmartNIC configured to transmit NVMe-oF commands could also include capability described with respect to FIG. 17A. A target offload hardware block can include a processor component 1750 that supports execution of NVMe commands sent through a network or fabric and received at SmartNIC 1700. In some examples (not depicted), the NVMe commands can be received from a server connected via a device interface from a server. In some examples, SmartNIC 1700 can be configured to act as a microserver to support execution of NVMe commands.

In some examples, driver 1752 can configure storage configuration interface 1690 to direct NVMe commands to NVMe Target Offload 1720. Driver 1752 can configure NVMe Target Offload 1720 to set NVMe namespaces that NVMe Target Offload 1720 is to process as opposed to NVMe namespaces that processor component 1750 is to process. For example, driver 1752 can operate in user space in some examples. Driver 1752 can execute on processor component 1750 of SmartNIC 1700 or a host server coupled to SmartNIC 1700. NVMe Target Offload 1720 can include a hardware, firmware, and/or processor-executed software device. For certain configured namespaces associated with connected NVMe SSDs, NVMe Target Offload 1720 can act as a fast data path to perform NVMe-oF target offload processing to bypass input/output processing flow of received NVMe-oF commands using processor component

1750. For example, NVMe Target Offload 1720 can de-encapsulate an NVMe-oF command from a network transport and provide an NVMe command for a namespace to a target NVMe SSD via PCIe root port 1756. For example, received NVMe commands processed by NVMe Target Offload 1720 can save processor cycles (e.g., CPU cycles) of processor component 1750. Storage configuration interface 1690 can provide an allocation of mailboxes and queues for use by the NVMe Target Offload 1720, as well as load balancing.

NVMe Target Offload 1720 can store NVMe commands in target queues. For example, target queues can be allocated by storage configuration interface 1690. In some examples, target queue can be 1:1 mapped to an NVMe queue (e.g., send queue (SQ) or completion queue (CQ)) for an NVMe SSD. For example, NVMe commands accessing a same namespace can be routed to a same target queue (NVMe queue). For example, for multiple NVMe queues allocated for accessing a same namespace, a load balancing can be performed (e.g., round robin) to distribute the commands across multiple NVMe queues.

For some configured namespaces, processor component 1750 can de-encapsulate an NVMe-oF command from a network transport and provide an NVMe command for a namespace to a target NVMe SSD via PCIe RP 1756. Processor component 1750 can be communicatively coupled to one or more NVMe compatible SSDs using an interface such as a PCIe root port (RP) 1756, CXL interface, or interface compatible with any standard or specification.

Figure 17B:
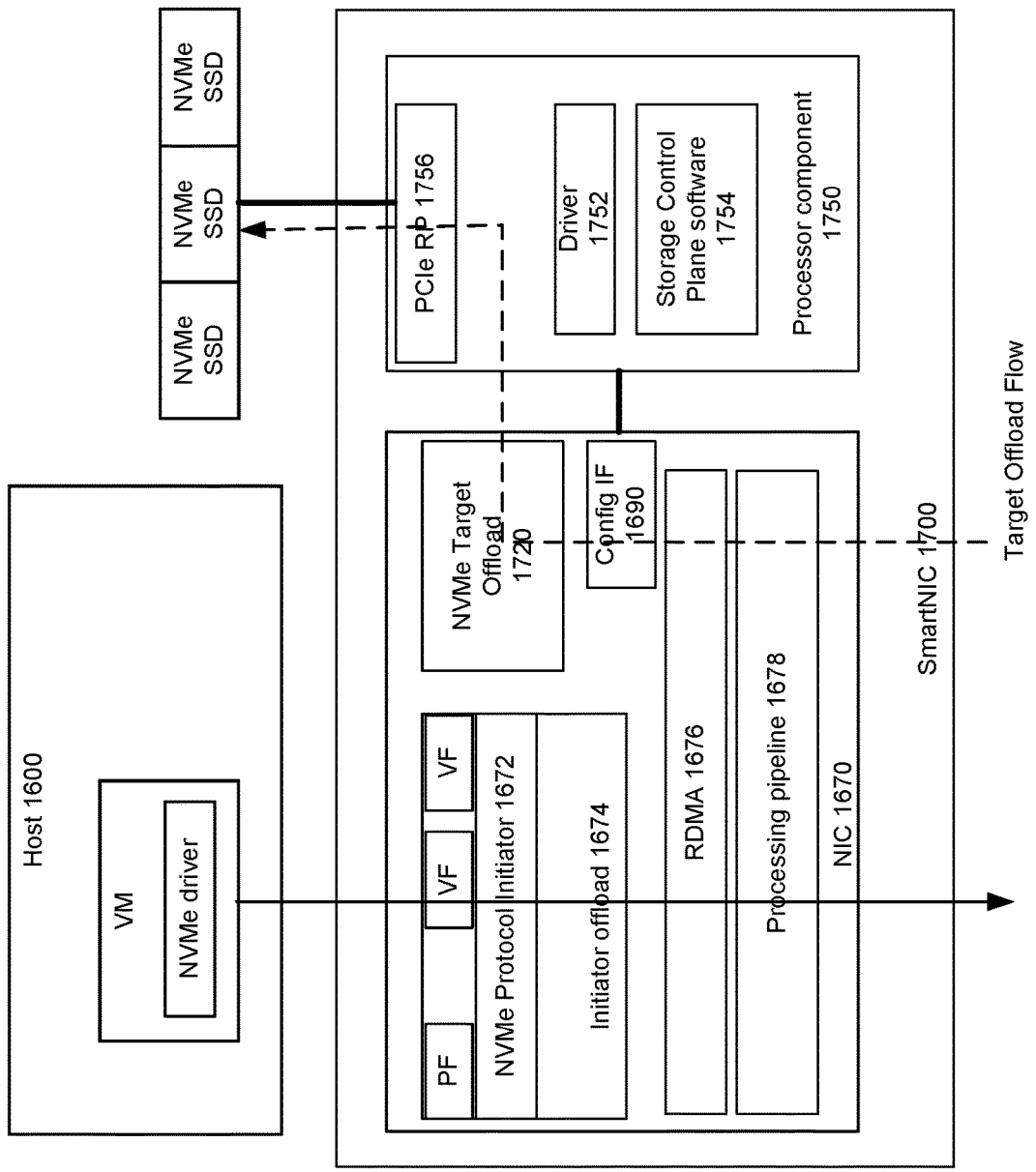
FIG. 17B depicts an example system.

FIG. 17B depicts an example system. In this example, host 1600 can initiate a NVMe command through a first path described earlier for transmission by SmartNIC 1700 to a remove NVMe storage device. SmartNIC 1700 can receive NVMe commands from a remote device to access an NVMe namespace associated with an NVMe SSD and perform the NVMe command execution through processor component 1750. Processor component 1750 can access an NVMe SSD through PCIe Root Port (RP) 1756 to access a target storage device to perform the NVMe command.

Figure 18A:
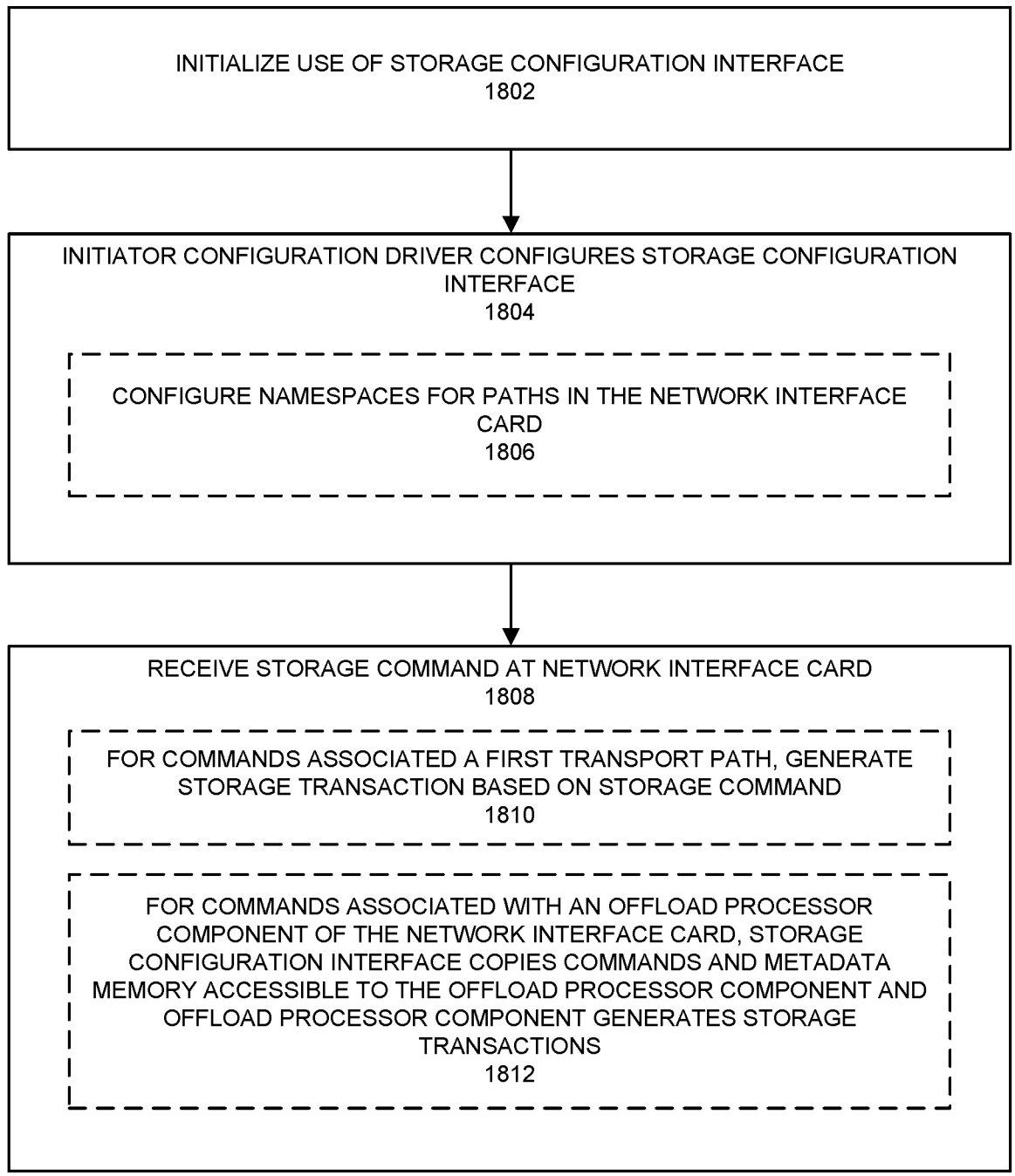
FIG. 18A depicts an example processor.

FIG. 18A depicts a process for a network interface card to process storage commands. At 1802, a storage configuration interface in a network interface can be initialized. For example, storage configuration interface can be accessible as a PCIe device. At 1804, an initiator configuration driver can configure use of the storage configuration interface. Initiator configuration driver can be a driver for PCIe device. In some examples, the initiator configuration driver can run in user space, along with an application. An application can include a DPDK or SPDK-based application. The initiator configuration driver can execute on a processor component of a SmartNIC or a host server coupled to the network interface card. At 1806, the initiator configuration driver can configure the storage configuration interface to set an NVMe namespace associated with a path of the SmartNIC. The initiator configuration driver can be a PCIe device driver that recognizes the availability of the storage configuration interface as a PCIe device and can configure the storage configuration interface to set an NVMe namespace associated with a first path of the SmartNIC. The first path of the SmartNIC can include processing circuitry to generate packets to convey NVMe commands over a transport layer. A second path through the SmartNIC can be associated with a different NVMe namespace and generate packets to convey NVMe commands over the same or different transport layer and perform other processing (e.g., cryptography).

At 1808, one or more storage commands can be received at the network interface card. At 1810, for commands associated with a first transport path, the processing circuitry of the first path can generate storage transactions to convey the NVMe commands. At 1812, in response to receipt of storage commands to be processed by the offload processor component of a network interface card, commands and meta data, storage configuration interface causes access to the commands and meta data to the offload processor component. For example, for commands associated with a namespace to be processed by the offload processor component, the storage configuration interface can cause the commands and meta data (e.g., identifiers of available commands in a queue) to be copied to a memory accessible to the offload processor component. PCIe mailbox queues can be used to pass commands or meta data to a memory accessible to the offload processor component. Load balancing techniques described herein can be used to allocate mailbox queues. The offload processor component can be implemented as a system on a chip with one or more processors and memory and accessible to a network interface. At 1812, the offload processor component can generate storage transactions to convey the NVMe commands using a configured transport layer and perform configured packet processing.

Figure 18B:
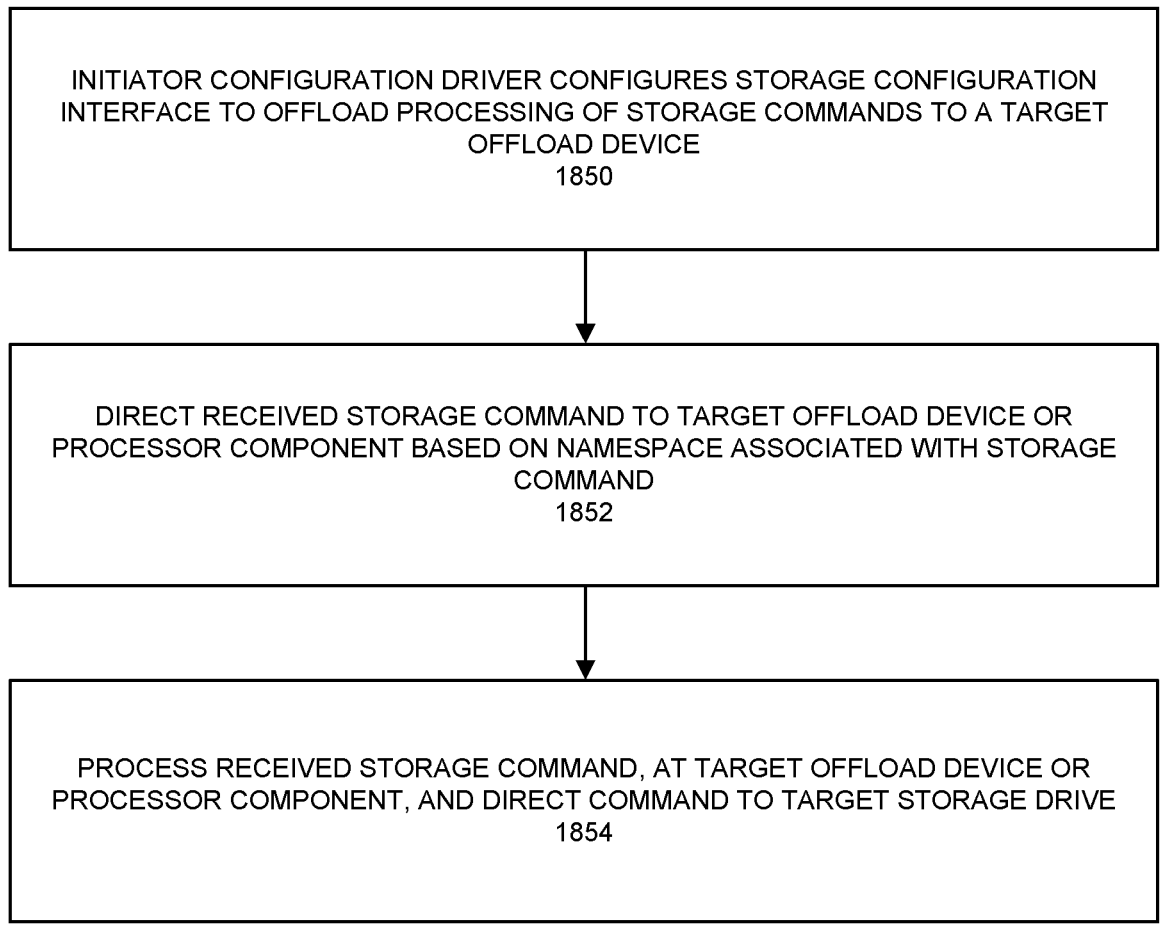
FIG. 18B depicts an example processor.

FIG. 18B depicts a process for a network interface card to process storage commands. At 1850, a configuration driver can configure a storage configuration interface to offload processing of storage commands received from a network or fabric to a target offload device. For example, the storage configuration interface can include a device interface (e.g., PCIe) and can be configured by the configuration driver. The target offload device can be implemented as a system on a chip with one or more processors and memory and accessible to a network interface card. In some examples, the network interface card can be a SmartNIC. For example, the configuration driver can allocate some namespaces for processing by the target offload device and allocate other namespaces for processing by a processor component of the SmartNIC.

At 1852, a storage command in a received packet can be directed to the target offload device or the processor component based at least on a namespace associated with a received storage command. For example, the storage command can include an NVMe command. At 1854, the storage command can be processed and directed to a storage drive for execution. The storage command can be processed by the target offload device or processor component based at least on a namespace associated with the received storage command. For a remote namespace accessed over a network, command processing can include de-encapsulation of an NVMe-oF command from a network transport (e.g., TCP transport for NVMe over TCP protocol, or RDMA transport for NVMe over RDMA protocol) and providing an NVMe command. The storage drive can be an NVMe compatible SSD that is communicatively coupled to the processor component. The storage drive can perform the NVMe command.

Figure 19:
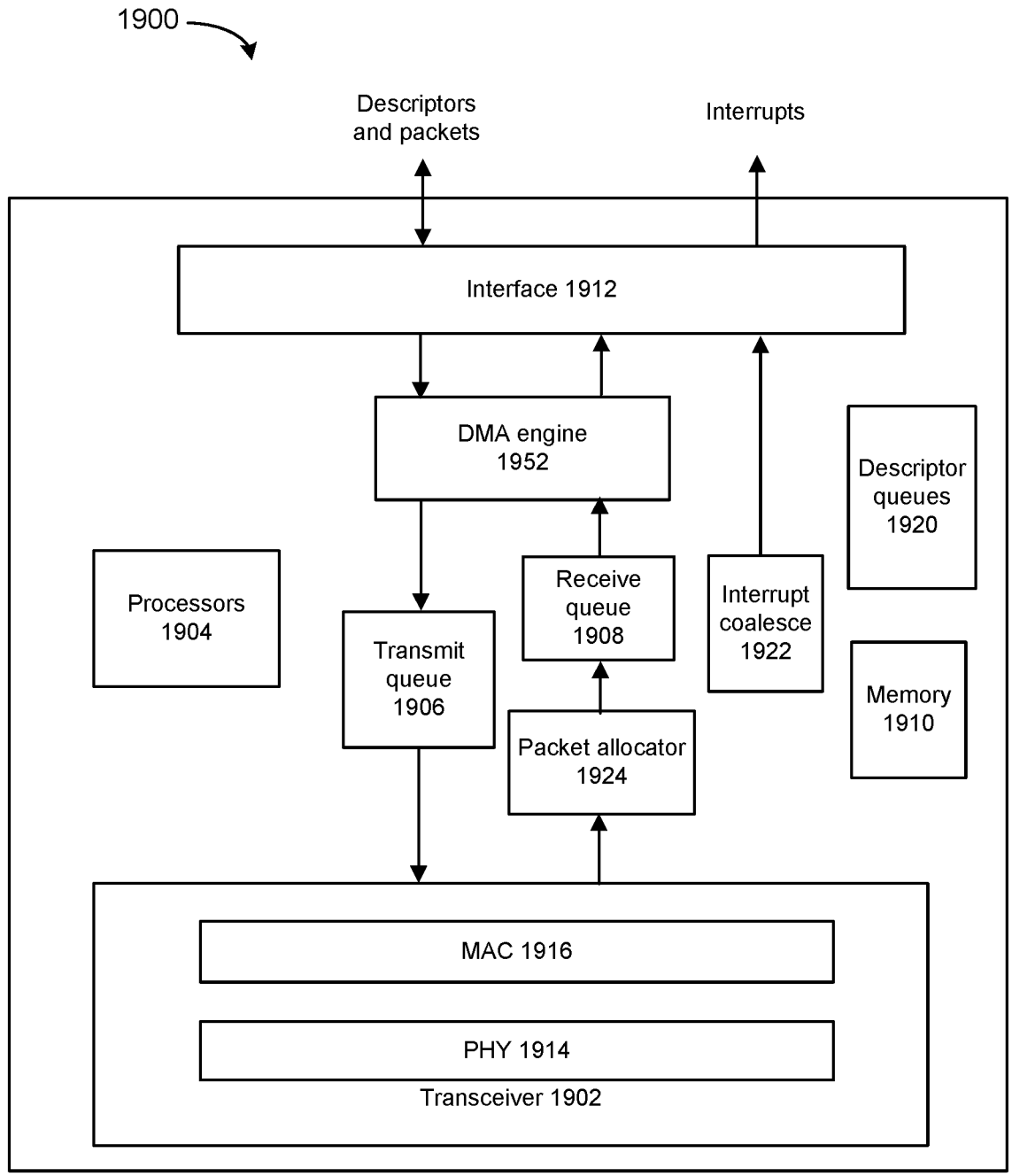
FIG. 19 depicts an example network interface.

FIG. 19 depicts a network interface that can use embodiments or be used by embodiments. In some embodiments, network interface an include capability to process NVMe commands in accordance with embodiments described herein. In some examples, network interface 1900 can be implemented as a network interface controller, network interface card, a host fabric interface (HFI), or host bus adapter (HBA), and such examples can be interchangeable. Network interface 1900 can be coupled to one or more servers using a bus, PCIe, CXL, or DDR. Network interface 1900 may be embodied as part of a system-on-a-chip (SoC)

that includes one or more processors, or included on a multichip package that also contains one or more processors.

Network interface 1900 can include transceiver 1902, processors 1904, transmit queue 1906, receive queue 1908, memory 1910, and bus interface 1912, and DMA engine 1952. Transceiver 1902 can be capable of receiving and transmitting packets in conformance with the applicable protocols such as Ethernet as described in IEEE 802.3, although other protocols may be used. Transceiver 1902 can receive and transmit packets from and to a network via a network medium (not depicted). Transceiver 1902 can include PHY circuitry 1914 and media access control (MAC) circuitry 1916. PHY circuitry 1914 can include encoding and decoding circuitry (not shown) to encode and decode data packets according to applicable physical layer specifications or standards. MAC circuitry 1916 can be configured to perform MAC address filtering on received packets, process MAC headers of received packets by verifying data integrity, remove preambles and padding, and provide packet content for processing by higher layers. MAC circuitry 1916 can be configured to assemble data to be transmitted into packets, that include destination and source addresses along with network control information and error detection hash values.

Processors 1904 can be any a combination of a: processor, core, graphics processing unit (GPU), field programmable gate array (FPGA), application specific integrated circuit (ASIC), or other programmable hardware device that allow programming of network interface 1900. For example, a "smart network interface" or SmartNIC can provide packet processing capabilities in the network interface using processors 1904. In some examples, processors 1904 can be implemented as a processor component for a SmartNIC.

Packet allocator 1924 can provide distribution of received packets for processing by multiple CPUs or cores using timeslot allocation described herein or RSS. When packet allocator 1924 uses RSS, packet allocator 1924 can calculate a hash or make another determination based on contents of a received packet to determine which CPU or core is to process a packet.

Interrupt coalesce 1922 can perform interrupt moderation whereby network interface interrupt coalesce 1922 waits for multiple packets to arrive, or for a time-out to expire, before generating an interrupt to host system to process received packet(s). Receive Segment Coalescing (RSC) can be performed by network interface 1900 whereby portions of incoming packets are combined into segments of a packet. Network interface 1900 provides this coalesced packet to an application.

Direct memory access (DMA) engine 1952 can copy a packet header, packet payload, and/or descriptor directly from host memory to the network interface or vice versa, instead of copying the packet to an intermediate buffer at the host and then using another copy operation from the intermediate buffer to the destination buffer. In some embodiments, multiple DMA engines are available for transfer of contents of packets to a destination memory associated with a host device or a destination memory associated with an accelerator device.

Memory 1910 can be any type of volatile or non-volatile memory device and can store any queue or instructions used to program network interface 1900. Transmit queue 1906 can include data or references to data for transmission by network interface. Receive queue 1908 can include data or references to data that was received by network interface from a network. Descriptor queues 1920 can include descriptors that reference data or packets in transmit queue 1906 or receive queue 1908 and corresponding destination memory regions. Bus interface 1912 can provide an interface with host device (not depicted). For example, bus interface 1912 can be compatible with PCI, PCI Express, PCI-x, Serial ATA, and/or USB compatible interface (although other interconnection standards may be used).

Figure 20:
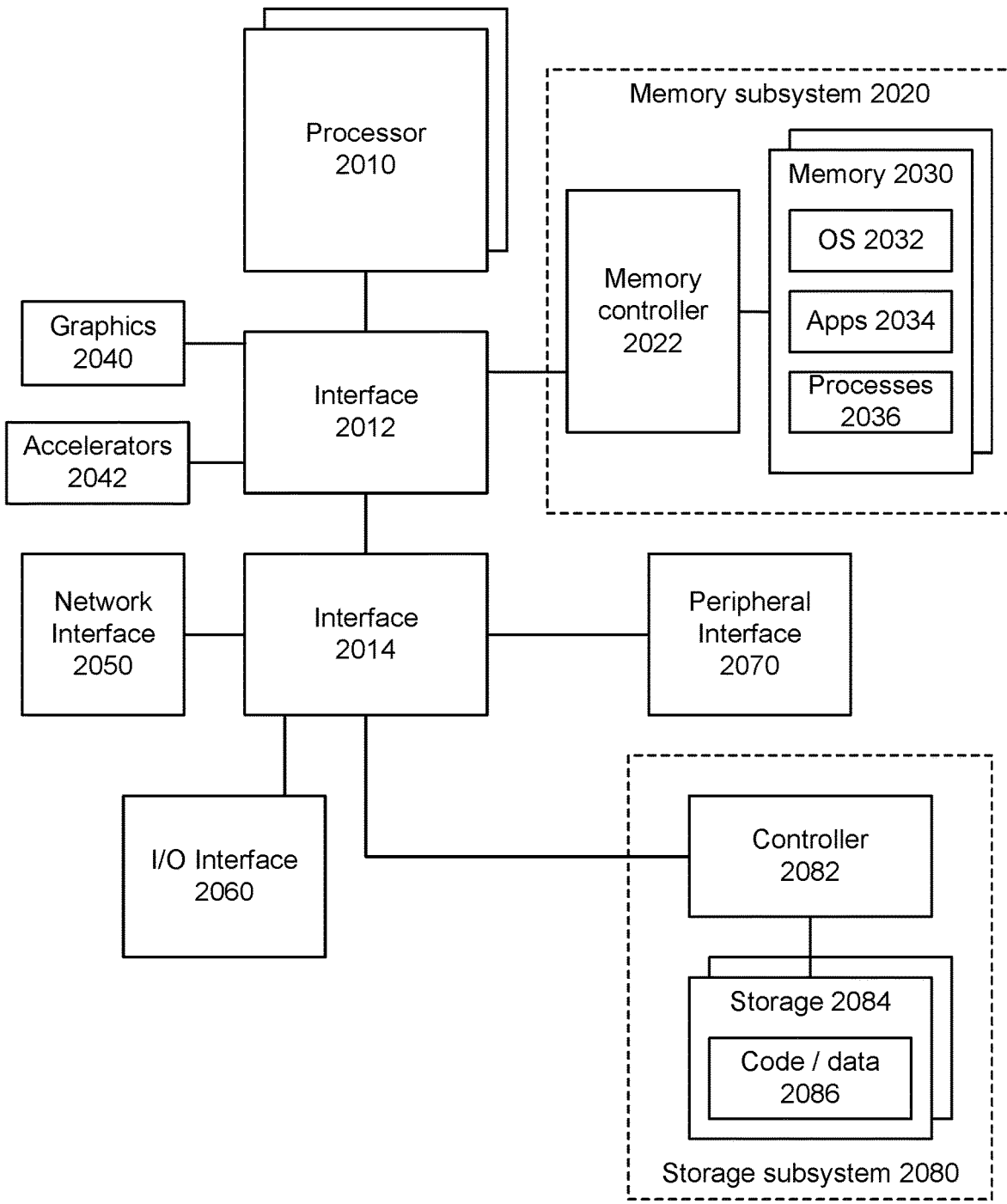
FIG. 20 depicts an example system.

FIG. 20 depicts a system. The system can use embodiments described herein for processing NVMe commands. System 2000 includes processor 2010, which provides processing, operation management, and execution of instructions for system 2000. Processor 2010 can include any type of microprocessor, central processing unit (CPU), graphics processing unit (GPU), processing core, or other processing hardware to provide processing for system 2000, or a combination of processors. Processor 2010 controls the overall operation of system 2000, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 2000 includes interface 2012 coupled to processor 2010, which can represent a higher speed interface or a high throughput interface for system components that needs higher bandwidth connections, such as memory subsystem 2020, graphics interface components 2040, or accelerators 2042. Interface 2012 represents an interface circuit, which can be a standalone component or integrated onto a processor die. Where present, graphics interface 2040 interfaces to graphics components for providing a visual display to a user of system 2000. In one example, graphics interface 2040 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 2040 generates a display based on data stored in memory 2030 or based on operations executed by processor 2010 or both. In one example, graphics interface 2040 generates a display based on data stored in memory 2030 or based on operations executed by processor 2010 or both.

Accelerators 2042 can be a programmable or fixed function offload engine that can be accessed or used by a processor 2010. For example, an accelerator among accelerators 2042 can provide compression (DC) capability, cryptography services such as public key encryption (PKE), cipher, hash/authentication capabilities, decryption, or other capabilities or services. In some embodiments, in addition or alternatively, an accelerator among accelerators 2042 provides field select controller capabilities as described herein. In some cases, accelerators 2042 can be integrated into a CPU socket (e.g., a connector to a motherboard or circuit board that includes a CPU and provides an electrical interface with the CPU). For example, accelerators 2042 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 2042 can provide multiple neural networks, processor cores, or graphics processing units can be made available for use by artificial intelligence (AI) or machine learning (ML) models.

For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 2020 represents the main memory of system 2000 and provides storage for code to be executed by processor 2010, or data values to be used in executing a routine. Memory subsystem 2020 can include one or more memory devices 2030 such as read-only memory (ROM), flash memory, one or more varieties of random access memory (RAM) such as DRAM, or other memory devices, or a combination of such devices. Memory 2030 stores and hosts, among other things, operating system (OS) 2032 to provide a software platform for execution of instructions in system 2000. Additionally, applications 2034 can execute on the software platform of OS 2032 from memory 2030. Applications 2034 represent programs that have their own operational logic to perform execution of one or more functions. Processes 2036 represent agents or routines that provide auxiliary functions to OS 2032 or one or more applications 2034 or a combination. OS 2032, applications 2034, and processes 2036 provide software logic to provide functions for system 2000. In one example, memory subsystem 2020 includes memory controller 2022, which is a memory controller to generate and issue commands to memory 2030. It will be understood that memory controller 2022 could be a physical part of processor 2010 or a physical part of interface 2012. For example, memory controller 2022 can be an integrated memory controller, integrated onto a circuit with processor 2010.

In some examples, OS 2032 can determine a capability of a device associated with a device driver. For example, OS 2032 can receive an indication of a capability of a device (e.g., NIC 2050 or a storage configuration interface) to configure a NIC 2050 to offload handling of NVMe command transmission or receipt to a processing component. OS 2032 can request a driver to enable or disable NIC 2050 to perform any of the capabilities described herein. In some examples, OS 2032, itself, can enable or disable NIC 2050 to perform any of the capabilities described herein. OS 2032 can provide requests (e.g., from an application or VM) to NIC 2050 to utilize one or more capabilities of NIC 2050. For example, any application can request use or non-use of any of capabilities described herein by NIC 2050.

While not specifically illustrated, it will be understood that system 2000 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus.

In one example, system 2000 includes interface 2014, which can be coupled to interface 2012. In one example, interface 2014 represents an interface circuit, which can include standalone components and integrated circuitry. In one example, multiple user interface components or peripheral components, or both, couple to interface 2014. Network interface 2050 provides system 2000 the ability to communicate with remote devices (e.g., servers or other computing devices) over one or more networks. Network interface 2050 can include an Ethernet adapter, wireless interconnection components, cellular network interconnection components, USB (universal serial bus), or other wired or wireless standards-based or proprietary interfaces. Network interface 2050 can transmit data to a remote device, which can include sending data stored in memory. Network interface 2050 can receive data from a remote device, which can include storing received data into memory. Various embodiments can be used in connection with network interface 2050, processor 2010, and memory subsystem 2020.

In one example, system 2000 includes one or more input/output (I/O) interface(s) 2060. I/O interface 2060 can include one or more interface components through which a user interacts with system 2000 (e.g., audio, alphanumeric, tactile/touch, or other interfacing). Peripheral interface 2070 can include any hardware interface not specifically mentioned above. Peripherals refer generally to devices that connect dependently to system 2000. A dependent connection is one where system 2000 provides the software platform or hardware platform or both on which operation executes, and with which a user interacts.

In one example, system 2000 includes storage subsystem 2080 to store data in a nonvolatile manner. In one example, in certain system implementations, at least certain components of storage 2080 can overlap with components of memory subsystem 2020. Storage subsystem 2080 includes storage device(s) 2084, which can be or include any conventional medium for storing large amounts of data in a nonvolatile manner, such as one or more magnetic, solid state, or optical based disks, or a combination. Storage 2084 holds code or instructions and data 2086 in a persistent state (e.g., the value is retained despite interruption of power to system 2000). Storage 2084 can be generically considered to be a "memory," although memory 2030 is typically the executing or operating memory to provide instructions to processor 2010. Whereas storage 2084 is nonvolatile, memory 2030 can include volatile memory (e.g., the value or state of the data is indeterminate if power is interrupted to system 2000). In one example, storage subsystem 2080 includes controller 2082 to interface with storage 2084. In one example controller 2082 is a physical part of interface 2014 or processor 2010 or can include circuits or logic in both processor 2010 and interface 2014.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). Another example of volatile memory includes cache or static random access memory (SRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 2000. More specifically, power source typically interfaces to one or multiple power supplies in system 2000 to provide power to the components of system 2000. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 2000 can be implemented using interconnected compute sleds of processors, memories, storages, network interfaces, and other components. High speed connections can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel® QuickPath Interconnect (QPI), Intel® Ultra Path Interconnect (UPI), Intel® On-Chip System Fabric (IOSF), Omnipath, Compute Express Link (CXL), Hyper-Transport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, DisplayPort, embedded DisplayPort, MIPI, HDMI, Infinity Fabric (IF), and successors or variations thereof.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

An example includes a computing system comprising: a network interface and a computing platform, the network interface comprising at least one processor to: configure a physical function or virtual function as a Peripheral Component Interconnect express (PCIe) device accessible in user space; allocate mailbox queues to pass commands between an offload block of a network interface and a processing block; and copy commands from a mailbox queue to a shared memory accessible to the processing block.

Example 1 includes any example and includes a network interface controller apparatus, comprising: a processor component comprising at least one processor to generate remote memory access communications to access a first group of one or more namespaces; storage interface circuitry to generate remote memory access communications to access a second group of one or more namespaces; and a storage configuration circuitry with a device interface that is accessible through a user space driver, the storage configuration circuitry to set the first and second group of one or more namespaces.

Example 2 includes any example, wherein the remote memory access communications are compatible with Non-Volatile Memory Express over Fabrics (NVMe-oF), Internet Small Computer Systems Interface (iSCSI), or a proprietary protocol.

Example 3 includes any example, wherein the device interface is compatible with Peripheral Component Interconnect Express (PCIe) and the storage configuration circuitry is accessible as a physical function (PF) or a virtual function (VF).

Example 4 includes any example, wherein the storage configuration circuitry is to copy commands and metadata sent to mailbox queues for access by the at least one processor of the processor component.

Example 5 includes any example, wherein the storage configuration circuitry is to apply load balancing to distribute commands among the mailbox queues.

Example 6 includes any example, wherein the commands comprise Non-Volatile Memory Express (NVMe) commands or Internet Small Computer Systems Interface (iSCSI) commands.

Example 7 includes any example, wherein: the user space driver is to execute on the at least one processor of the processor component and the storage configuration circuitry is configured by the user space driver.

Example 8 includes any example, wherein: the storage configuration circuitry is re-assignable to a user space driver executing on a host server based on the processor component becoming inactive or being removed.

Example 9 includes any example, wherein the user space driver is to pass-through access to the configuration circuitry through the device interface to a user space application.

Example 10 includes any example, wherein the user space application is based on Storage Performance Development Kit (SPDK), Data Plane Development Kit (DPDK) or OpenDataPlane.

Example 11 includes any example, and includes a method comprising: by a device interface that is accessible through a user space driver, configuring a storage configuration interface circuitry of a smart network interface controller (SmartNIC) to copy memory access communications for execution by a processor component coupled to the SmartNIC.

Example 12 includes any example, and includes configuring the processor component to generate remote memory access communications for a group of one or more namespaces.

Example 13 includes any example, and includes configuring circuitry of the SmartNIC to generate remote memory access communications for a second group of one or more namespaces.

Example 14 includes any example, wherein the remote memory access communications are compatible with Non-Volatile Memory Express over Fabrics (NVMe-oF), Internet Small Computer Systems Interface (iSCSI), or a proprietary protocol.

Example 15 includes any example, wherein the device interface is compatible with Peripheral Component Interconnect Express (PCIe) and the storage configuration interface circuitry is accessible as a physical function (PF) or a virtual function (VF).

Example 16 includes any example, wherein the storage configuration interface circuitry is to copy commands and metadata sent to mailbox queues for access by at least one processor of a processor component.

Example 17 includes any example, and includes applying load balancing to distribute commands among the mailbox queues.

Example 18 includes any example, and includes a computer-readable medium comprising instructions stored thereon, that if executed by one or more processors, cause the one or more processors to: execute a driver configure a storage configuration circuitry of a smart network interface (SmartNIC) to set first and second group of one or more namespaces for management by the SmartNIC, wherein: the driver executes in user space, the storage configuration circuitry is accessible by the driver using a device interface, a processor component comprising at least one processor is to generate remote memory access communications to access the first group of one or more namespaces, and a storage interface circuitry to generate remote memory access communications to access the second group of one or more namespaces.

Example 19 includes any example, wherein the remote memory access communications are compatible with Non-Volatile Memory Express over Fabrics (NVMe-oF).

Example 20 includes any example, wherein the device interface is compatible with Peripheral Component Interconnect Express (PCIe) and the storage configuration circuitry is accessible as a physical function (PF) or a virtual function (VF).

What is claimed is:

1. A network interface controller apparatus, comprising:
a network interface controller comprising:
at least one processor to generate remote memory access communications to access a first group of one or more namespaces;
first circuitry to generate remote memory access communications to access a second group of one or more namespaces, wherein the first and second groups of one or more namespaces comprise storage blocks formatted for block access; and
second circuitry coupled to a device interface, the second circuitry to set the first and second group of one or more namespaces based on a configuration.

2. The apparatus of claim 1, wherein the remote memory access communications are consistent with Non-Volatile Memory Express over Fabrics (NVMe-oF), Internet Small Computer Systems Interface (iSCSI), or a proprietary protocol.

3. The apparatus of claim 1, wherein the device interface is compatible with Peripheral Component Interconnect Express (PCIe) and the second circuitry is accessible as a physical function (PF) or a virtual function (VF).

4. The apparatus of claim 1, wherein the second circuitry is to copy commands and metadata sent to mailbox queues for access by the at least one processor.

5. The apparatus of claim 4, wherein the second circuitry is to apply load balancing to distribute commands among the mailbox queues.

6. The apparatus of claim 4, wherein the commands comprise Non-Volatile Memory Express (NVMe) commands or Internet Small Computer Systems Interface (iSCSI) commands.

7. The apparatus of claim 1, wherein:
the at least one processor is to execute a user space driver and
the second circuitry is configured by the user space driver.

8. The apparatus of claim 7, wherein:
the second circuitry is re-assignable to a second user space driver executing on a host server based on the at least one processor becoming inactive or being removed.

9. The apparatus of claim 7, wherein the user space driver is to pass-through access to the second circuitry through the device interface to a user space application.

10. The apparatus of claim 9, wherein the user space application is based on Storage Performance Development Kit (SPDK), Data Plane Development Kit (DPDK) or OpenDataPlane.

11. The apparatus of claim 1, comprising: a server, rack switch or data center, wherein the server, rack switch or data center are coupled to the network interface controller.

12. A method comprising:
via a device interface that is accessible through a user space driver, configuring a storage configuration interface circuitry of a network interface controller (NIC) to copy memory access communications to access a first group of one or more namespaces for processing by a processor component coupled to the NIC and configure offload circuitry to generate remote memory access communications to access a second group of one or more namespaces, wherein the first and second groups of one or more namespaces comprise storage blocks formatted for block access.

13. The method of claim 12, comprising:
configuring the processor component to configure the storage configuration interface circuitry to cause the offload circuitry to generate remote memory access communications for the second group of one or more namespaces.

14. The method of claim 13, wherein the remote memory access communications are compatible with Non-Volatile Memory Express over Fabrics (NVMe-oF), Internet Small Computer Systems Interface (iSCSI), or a proprietary protocol.

15. The method of claim 13, wherein the device interface is compatible with Peripheral Component Interconnect Express (PCIe) and the storage configuration interface circuitry is accessible as a physical function (PF) or a virtual function (VF).

16. The method of claim 12, wherein the storage configuration interface circuitry is to copy commands and metadata sent to mailbox queues for access by at least one processor of a processor component.

17. The method of claim 16, comprising:
applying load balancing to distribute commands among the mailbox queues.

18. A non-transitory computer-readable medium comprising instructions stored thereon, that if executed by one or more processors, cause the one or more processors to:
execute a driver configure a storage configuration circuitry of a network interface controller (NIC) to set first and second group of one or more namespaces for management by the NIC, wherein:
the driver executes in user space,
the storage configuration circuitry is accessible by the driver using a device interface,
a processor component comprising at least one processor is to generate remote memory access communications to access the first group of one or more namespaces,
a storage interface circuitry to cause offload circuitry to generate remote memory access communications to access the second group of one or more namespaces, and
the first and second groups of one or more namespaces comprise storage blocks formatted for block access.

19. The computer-readable medium comprising instructions of claim 18, wherein the remote memory access communications are consistent with Non-Volatile Memory Express over Fabrics (NVMe-oF) and the first and second groups of one or more namespaces are consistent with NVMe-oF.

20. The computer-readable medium comprising instructions of claim 18, wherein the device interface is compatible with Peripheral Component Interconnect Express (PCIe) and the storage configuration circuitry is accessible as a physical function (PF) or a virtual function (VF).

21. The apparatus of claim 1, wherein:
the first circuitry is to perform offloaded Non-Volatile Memory Express (NVMe) storage device access operations,
the second circuitry is configured to attach an NVMe namespace to a virtual function (VF) or a physical function (PF), and
the configuration is based on access to a Base Address Register (BAR) consistent with Peripheral Component Interconnect Express (PCIe) via the device interface.

22. The apparatus of claim 21, wherein a host system or the at least one processor is to configure the second circuitry to attach an NVMe namespace to a VF or a PF.

23. The apparatus of claim 1, wherein the configuration is to associate addressable memory regions of storage with at least a namespace for a virtual function (VF) and remote direct memory access (RDMA) queue pair.

* * * * *